(12) United States Patent
Lentz et al.

(10) Patent No.: US 12,494,696 B2
(45) Date of Patent: Dec. 9, 2025

(54) SEMI-COHERENT GRAVITATIONAL WAVE BEAM GENERATION AND RELATED APPARATUS, SYSTEMS, AND METHODS

(71) Applicant: Unspace, LLC, Houston, TX (US)

(72) Inventors: Phillip Scott Lentz, Port Aransas, TX (US); Jonathan Crombe, Spring, TX (US); Kevin Stephens, Jr., Houston, TX (US); Evan Laske, League City, TX (US)

(73) Assignee: Unspace, LLC, Houston, TX (US)

( * ) Notice: Subject to any disclaimer, the term of this patent is extended or adjusted under 35 U.S.C. 154(b) by 331 days.

(21) Appl. No.: 18/224,975

(22) Filed: Jul. 21, 2023

(65) Prior Publication Data

US 2024/0097527 A1 Mar. 21, 2024

Related U.S. Application Data

(60) Provisional application No. 63/406,978, filed on Sep. 15, 2022.

(51) Int. Cl.
*H02K 7/18* (2006.01)
*G01V 7/00* (2006.01)
(Continued)

(52) U.S. Cl.
CPC ............ *H02K 7/1823* (2013.01); *G01V 7/00* (2013.01); *H01P 7/04* (2013.01); *H04B 13/00* (2013.01)

(58) Field of Classification Search
CPC ...... H02K 7/1823; H02K 7/1853; G01V 7/00; H01P 7/04; H04B 13/00; H04B 10/90
See application file for complete search history.

(56) References Cited

U.S. PATENT DOCUMENTS 3,336,806 A 8/1967 Kalmus
3,599,492 A 8/1971 Kalmus et al.
(Continued)

FOREIGN PATENT DOCUMENTS

CN 102158289 A 8/2011
WO 2019129746 A1 7/2019

OTHER PUBLICATIONS

Cai, R.G., Cao, Z., Guo, Z.K., Wang, S.J. and Yang, T., 2017. The gravitational-wave physics. National Science Review, 4(5), pp. 687-706.*

(Continued)

*Primary Examiner* — Zhitong Chen
(74) *Attorney, Agent, or Firm* — Patterson + Sheridan, LLP

(57) ABSTRACT

Aspects of the present disclosure relate to generation of a semi-coherent gravitational wave beam and related apparatus, systems, and methods, such as for at least gravitational wave communication. In one or more embodiments, a gravitational wave generator includes a generator frame, and a first rotatable mass mounted to the generator frame. The first rotatable mass is rotatable about a generator axis and rotatable relative to the generator frame to generate one or more gravitational waves. The gravitational wave generator includes one or more wave guide stages that include two or more guide assemblies. The two or more guide assemblies each include a guide frame, and a second rotatable mass mounted to the guide frame. The second rotatable mass is rotatable about a guide axis and rotatable relative to the guide frame to at least partially focus the one or more gravitational waves into one or more collimated beams.

21 Claims, 17 Drawing Sheets

(51) Int. Cl.
*H01P 7/04* (2006.01)
*H04B 13/00* (2006.01)

(56) References Cited

U.S. PATENT DOCUMENTS

| | | | |
|---|---|---|---|
| 6,134,258 | A | 10/2000 | Tulloch et al. |
| 8,066,226 | B2 | 11/2011 | Fiala et al. |
| 10,302,808 | B2 | 5/2019 | Chiao |
| 11,384,727 | B2 | 7/2022 | Sheldon-Coulson et al. |
| 2017/0304894 | A1 | 10/2017 | Buller |
| 2020/0371269 | A1 | 11/2020 | Margaritova et al. |
| 2022/0117837 | A1 | 4/2022 | Northen et al. |
| 2023/0341574 | A1 | 10/2023 | Harney et al. |
| 2024/0019601 | A1 | 1/2024 | Lentz et al. |
| 2024/0097798 | A1 | 3/2024 | Lentz et al. |

OTHER PUBLICATIONS

Weber, J., 1960. Detection and generation of gravitational waves. Physical Review, 117(1), p. 306.*

"GravitationalWaves", TAPIRatCaltech,<http:/Avww.tapir.caltech.edu/~teviet/Waves/gwavehtml> 2015.*

Goetz, E. et al., "Coherently combining data between detectors for all-sky semi-coherent continuous gravitational wave searches", Classical and Quantum Gravity, vol. 33, No. 8, 2016, <https://iopscience.iop.org/article/10.1088/0264-9381/33/8/085007>.

International Search Report and Written Opinion dated Jan. 11, 2024 for Application No. PCT/US2023/072036.

Rothleitner, C. et al., "Invited Review Article: Measurements of the Newtonian constant of gravitation, G", Review of Scientific Instruments, vol. 88, Issue 11, 2017, pp. 1-27, <https://aip.scitation.org/doi/10.1063/1.4994619>.

"Gravitational Waves", TAPIR at Caltech, <http://www.tapir.caltech.edu/~teviet/Waves/gwave.html>. 2015.

He, Zhongfu et al., "Capacitive Pressure Sensor with High Sensitivity and Fast Response to Dynamic Interaction Based on Graphene and Porous Nylon Networks", ACS Publications, 2018, pp. 12816-12823, <https://pubs.acs.prg/doi/abs/10.1021/acsami.8b01050>.

Waters, Richard L et al., "Electro-Optical Ultra Sensitive Accelerometer", Space and Naval Warfare Systems Center, 2002, pp. 1-10, <https://apps.dtic.mil/sti/citations/ADA506920>.

"Gravitational Torsion Balance, AP-8215A", Instruction Manual with Experimental Guide and Teachers' Notes 012-11032D, Pasco, pp. 1-18, Previously retrieved on Jul. 13, 2022, <https://cdn.pasco.com/product_document/Gravitational-Torsion-Balance-Manual-AP-8215A. pdf>.

* cited by examiner

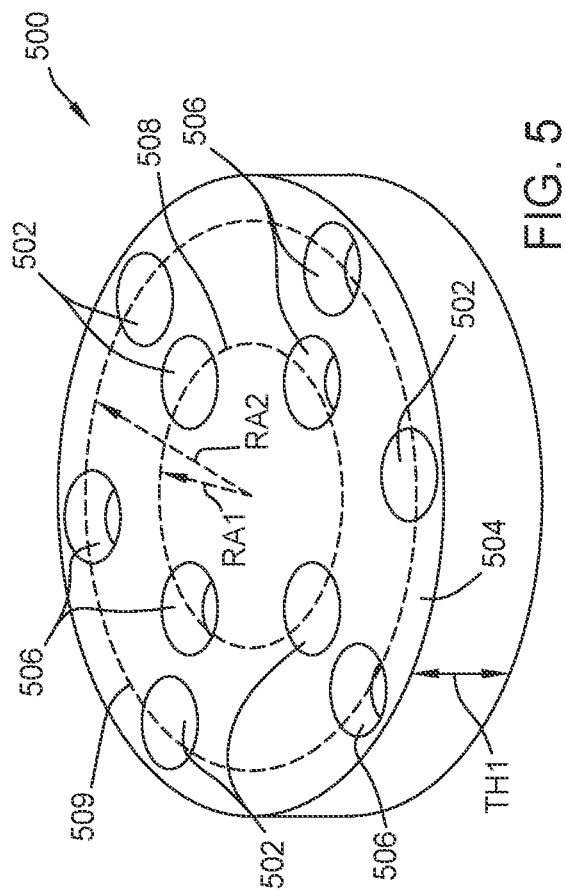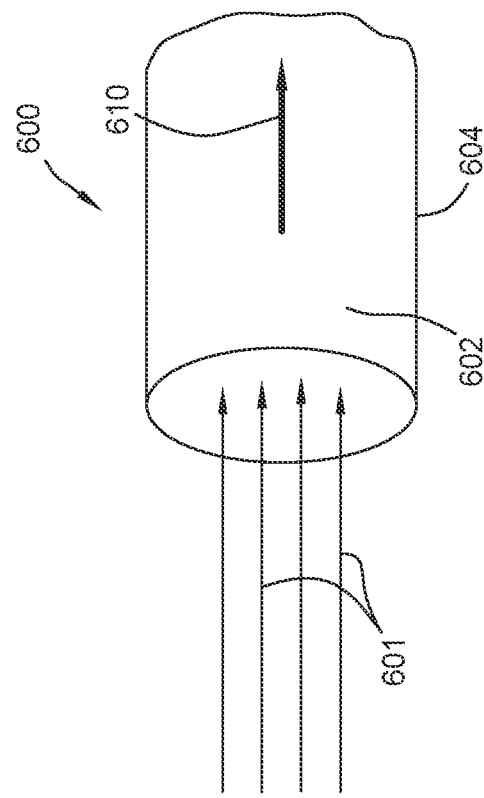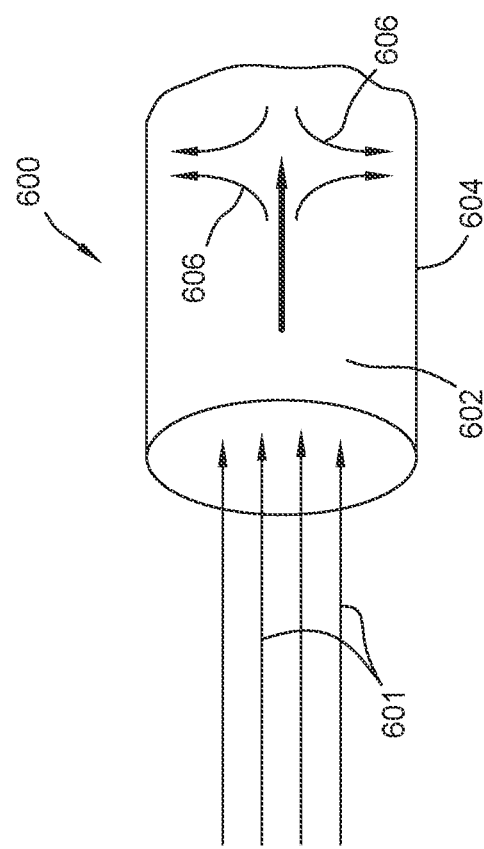

$$g_{uv} = \begin{pmatrix} p^2\left(c^2 - \left(\dfrac{v_t\, dv_t}{\sqrt{c^2 - v_t^2}}\right)^2\right) & 0 & 0 & 0 \\ 0 & \dfrac{-p^2}{1 - \dfrac{\left(\dfrac{v_t\, dv_t}{\sqrt{c^2 - v_t^2}}\right)^2}{c^2}} & 0 & 0 \\ 0 & 0 & -r^2 & 0 \\ 0 & 0 & 0 & -r^2 \sin^2\theta \end{pmatrix}$$

FIG. 20

$$\frac{dv_\lambda^r}{d\lambda} = -\left(\frac{R^2}{r^2}\right) r \left(1 - \frac{3\left(\dfrac{v_t\, dv_t}{\sqrt{c^2 - v_t^2}}\right)^2}{c^2}\right) (v_\lambda^\theta)^2$$

FIG. 21

$$d\theta_{\text{deflection}} = \text{angle of deflection} = \sqrt{p^2\, \frac{3\left(\dfrac{v_t\, dv_t}{\sqrt{c^2 - v_t^2}}\right)^2}{c^2}}$$

FIG. 22

SEMI-COHERENT GRAVITATIONAL WAVE BEAM GENERATION AND RELATED APPARATUS, SYSTEMS, AND METHODS

CROSS-REFERENCE TO RELATED APPLICATION

This application claims priority to U.S. provisional patent application Ser. No. 63/406,978, filed Sep. 15, 2022, which is herein incorporated by reference in its entirety.

BACKGROUND

Field

Aspects of the present disclosure relate to generation of a semi-coherent gravitational wave beam and related apparatus, systems, and methods, such as for at least gravitational wave communication.

Description of the Related Art

Communication systems can be hindered by line of sight, barriers, and/or range limitations. Exemplary barriers can include terrain interference (such as from mountains, caves, and/or water), the earth, the moon, and structural barriers (such as those made of rock, concrete, and/or steel). Communication systems can also be hindered by environmental factors, such as solar wind and/or storms. Such environmental factors and barriers can affect the efficacy and accuracy of communications. For example, atmospheric ionization and coherence loss can hinder effective communications. Additionally, communication systems can be susceptible to infrastructure risks, such as from solar storms, weapons (nuclear or EMP), and cyber-attacks. Moreover, it can be difficult to generate communication signals through such interferences at large distances that can be accurately detected.

Therefore, there is a need for improved communication methods, systems, and apparatus.

SUMMARY

Aspects of the present disclosure relate to generation of a semi-coherent gravitational wave beam and related apparatus, systems, and methods, such as for at least gravitational wave communication.

In one or more embodiments, a gravitational wave generator includes a generator frame, and a first rotatable mass mounted to the generator frame. The first rotatable mass is rotatable about a generator axis and rotatable relative to the generator frame to generate one or more gravitational waves. The gravitational wave generator includes one or more wave guide stages that include two or more guide assemblies. The two or more guide assemblies each include a guide frame, and a second rotatable mass mounted to the guide frame. The second rotatable mass is rotatable about a guide axis and rotatable relative to the guide frame to at least partially focus the one or more gravitational waves into one or more collimated beams, and the guide axis is oriented non-parallel to the generator axis.

In one or more embodiments, a gravitational wave generator includes a generator frame, and a first rotatable mass mounted to the generator frame. The first rotatable mass is rotatable about a generator axis. The gravitational wave generator includes one or more wave guide stages that include two or more guide assemblies. Each of the two or more guide assemblies includes a guide frame, and a second rotatable mass mounted to the guide frame. The second rotatable mass is rotatable about a guide axis, and the guide axis is oriented non-parallel to the generator axis. The gravitational wave generator includes an adjustment assembly configured to adjust the guide axis of each second rotatable mass of the two or more guide assemblies. The adjustment assembly includes a drive shaft, and a travel block disposed along the drive shaft, and a drive arm pivotably coupled to the travel block and pivotably coupled to the guide frame.

BRIEF DESCRIPTION OF THE DRAWINGS

So that the manner in which the above-recited features of the disclosure can be understood in detail, a more particular description of the disclosure, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIG. 5 is a schematic perspective view of a rotatable mass, according to one or more embodiments.

FIGS. 6A and 6B are schematic side views of a microwave cavity detector, according to one or more embodiments.

FIG. 20 shows an equation that approximates a gravitational field component ($g_{\mu\nu}$), according to one or more embodiments.

FIG. 21 shows an equation that approximates a change in wave velocity to an exponent of distance (r) ($dv_\lambda{}^r$) divided by a change in wavelength ($d\lambda$), according to one or more embodiments.

FIG. 22 shows an equation that approximates an angle of deflection ($d\theta_{deflection}$) of a graviton ray, according to one or more embodiments.

Figure 1A:
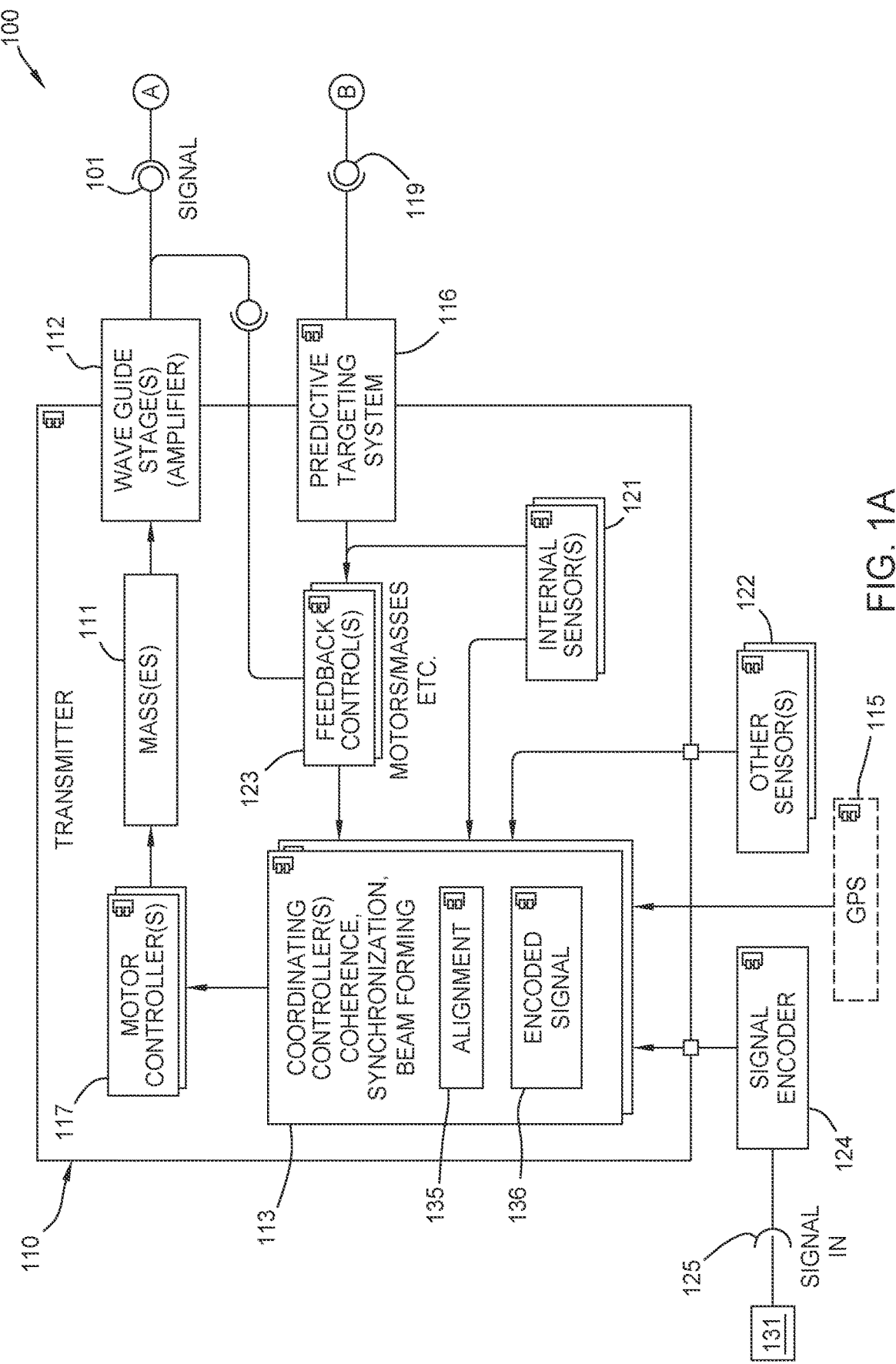
FIG. 1A is a schematic diagram view of a transmitter of a system, according to one or more embodiments.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to methods, systems, and apparatus for wireless gravitational wave communication, such as at least semi-coherent gravitational wave communication, for example coherent gravitational wave communication. A wireless gravitational wave communication system includes a transmitter configured to generate and send one or more gravitational wave signals. The transmitter includes one or more rotatable masses, and one or more motors configured to drive (e.g., apply variable acceleration to) the one or more rotatable masses. The system includes a receiver in wireless communication with the transmitter. The receiver includes a wave sensor configured to recognize the one or more gravitational wave signals. In one or more embodiments, the generation of the one or more semi-coherent gravitational wave signals can induce changes in the gravitational constant related to nuances of the Theory of General Relativity and a novel radial dilation effect caused by various (e.g., modulated) spinning states that dynamically affect spacetime curvature. Such gravitational changes in spacetime are focused by one or more wave guide stages along a propagation axis, creating a semi-coherent beam containing the one or more gravitational wave signals that are detectable by a targeted receiver. In one or more embodiments, a frequency and/or an amplitude of a rotation speed of one or more rotatable masses is modulated to generate the one or more gravitational wave signals. Information can be encoded into, and decoded from, the one or more gravitational wave signals.

Aspects of the present disclosure also relate to gravitational wave generators and related apparatus, systems, and methods, such as for at least semi-coherent gravitational wave communication. In one or more embodiments, a gravitational wave generator includes a generator frame, and a first rotatable mass mounted to the generator frame. The first rotatable mass is rotatable about a generator axis and rotatable relative to the generator frame to generate one or more gravitational waves. The gravitational wave generator includes one or more wave guide stages that include two or more guide assemblies. Each of the two or more guide assemblies includes a guide frame, and a second rotatable mass mounted to the guide frame. The second rotatable mass is rotatable about a guide axis and rotatable relative to the guide frame to at least partially focus the one or more gravitational waves into one or more collimated beams. The guide axis is oriented non-parallel to the generator axis. In one or more embodiments, a gravitational wave generator includes an adjustment assembly configured to pivot (e.g., rotate) the guide frame and the second rotatable mass to adjust a guide angle of the second rotatable mass. The adjustment of the guide angle alters a focusing of one or more gravitational wave signals (when the second rotatable mass rotates) that are generated by rotating the first rotatable mass. The adjustment assembly can simultaneously adjust the guide angle of the two or more guide assemblies, or the adjustment assembly can independently adjust the guide angle of each of the two or more guide assemblies.

Figure 1B:
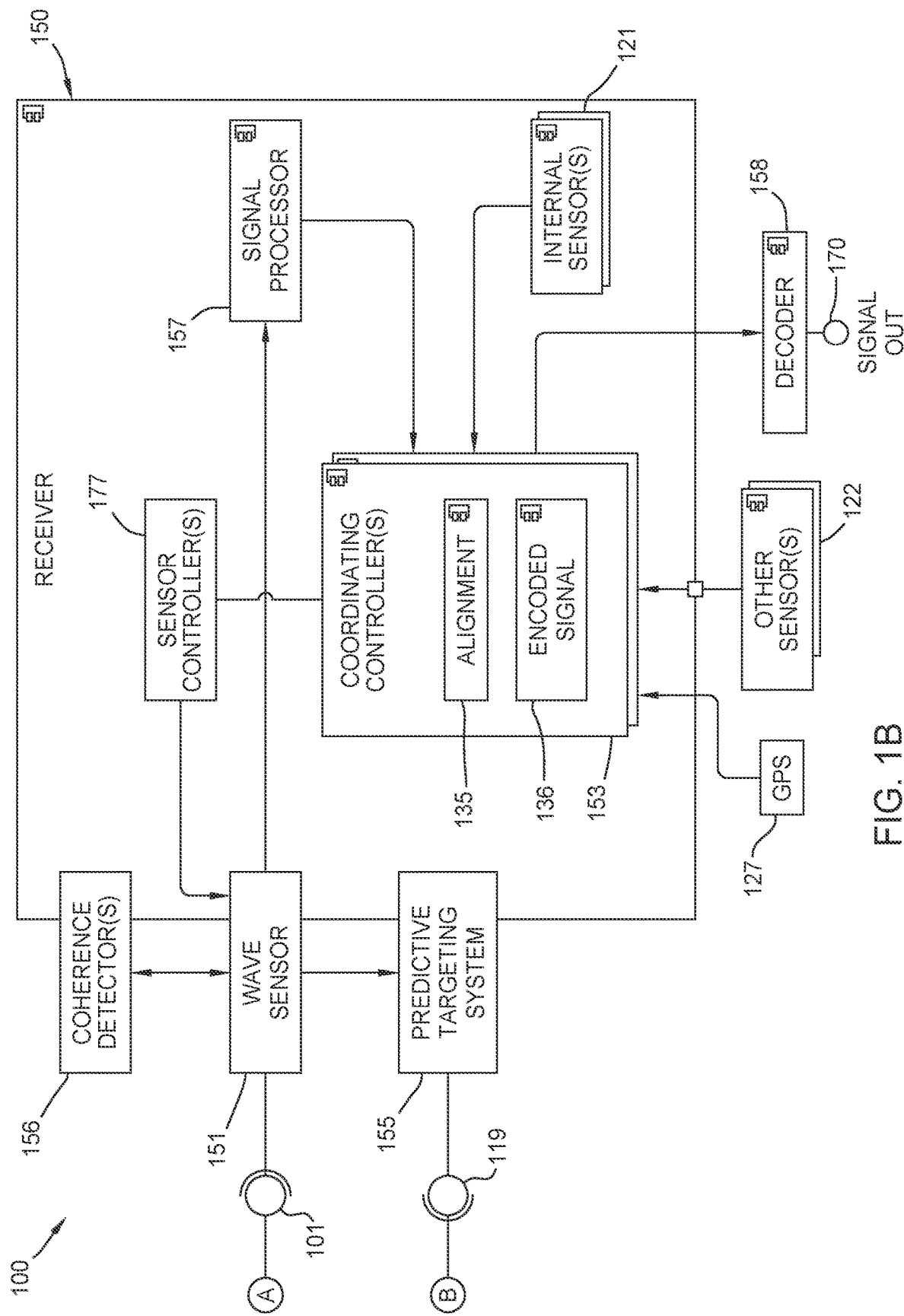
FIG. 1B is a schematic diagram view of a receiver of the system, according to one or more embodiments.

FIG. 1A is a schematic diagram view of a transmitter 110 of a system 100, according to one or more embodiments. FIG. 1B is a schematic diagram view of a receiver 150 of the system 100, according to one or more embodiments.

The system 100 is a wireless gravitational wave communication system. The system 100 includes the transmitter 110 configured to generate and send one or more gravitational wave signals 101. In one or more embodiments, the one or more gravitational wave signals 101 include a plurality of gravitational wave signals 101 that are at least semi-coherent (such as substantially coherent) with each other. The wave signals 101 can be semi-coherent or substantially coherent with each other to have similar phases (such as within a difference of 75% or less, for example 50% or less) or substantially similar phases (such as within a difference of 10% or less), similar frequencies (such as within a difference of 50% or less) or substantially similar frequencies (such as within a difference of 10% or less), and/or columniation (e.g., collimization) with each other, and/or similar amplitudes (such as within a difference of 50% or less) or substantially similar amplitudes (such as within a difference of 10% or less). The present disclosure contemplates that the difference in phase can be larger than the difference in frequency and/or the difference in frequency. In one or more embodiments, the system 100 guides (e.g., focuses) gravitational waves into one or more columnized (e.g., collimated) beams.

The transmitter 110 includes one or more rotatable masses 111, and one or more motors configured to drive the one or more rotatable masses 111. The transmitter 110 includes one or more wave guides 112 (e.g., an amplifier). The one or more rotatable masses 111 can be similar, for example, to the rotatable masses 131a, 131b (and can include one or more of the aspects, features, components, and/or properties thereof) described and shown in co-pending U.S. patent application Ser. No. 17/864,090, filed Jul. 13, 2022, which is herein incorporated by reference in its entirety. The rotatable masses 111 can be angularly accelerated and/or decelerated to generate the gravitational waves. The one or more rotatable masses 111 can include, for example, radially symmetric bodies (e.g., spheres and/or discs). The one or more rotatable masses 111 can include, for example, a multi-alloy mass having a varying mass distribution (such as the rotatable mass 500 shown in FIG. 5), a slotted mass with angular momentum, spinning masses at the ends of a, axially symmetric rod, a mass oscillating in a cylindrical cavity, angularly accelerating bodies along an angular (e.g., spinning) movement path, linearly accelerating bodies along a linear movement path, and/or multiple colliding masses.

The system 100 includes the receiver 150 in wireless communication with the transmitter 110. The receiver 150 includes a wave sensor 151 configured to recognize the one or more gravitational wave signals 101. In one or more embodiments, the wave sensor 151 includes a chip-scale atomic clock (CSAC). In one or more embodiments, the wave sensor 151 includes a fiber optic cable. In one or more embodiments, the fiber optic cable includes one or more coils. Other orientations are contemplated for the fiber optic cable such that the cable is not completely linear. In one or more embodiments, coils of two fiber optic cables oppose each other and use the Sagnac effect to detect changes in spacetime. The wave sensor 151 can include a fiber optic detector (such as the fiber optic detector 800 shown in FIG. 8).

Other sensors are contemplated for the wave sensor 151, such as a mechanical detector, a noisy detector, and/or an electromagnetic field detector. The mechanical detector can include for example, a normal-mode vibration detector (such as a detector that detects normal-mode vibration of an elastic bar or other structure), an angular acceleration detector (such as a detector that detects the angular acceleration of a rotation bar or a driven oscillator), and/or a fluid detector (such as a detector that detects fluid pumping in a rotating loop. The noisy detector can have a resonance width that is smaller than a radiation bandwidth, and can include stochastic tools that extract the one or more gravitational wave signals a Brownian signal. The noisy detector can include, for example, a supercooled Weber-bar made of monocrystalline of quartz operating in a fundamental mode of vibration, and the detector detects changes in vibration amplitude induced by the one or more gravitational wave signals.

The electromagnetic field detector detects the gravitational radiation interface with electromagnetic fields. The electromagnetic field detector can be, for example, a microwave cavity detector (such as the microwave cavity detector 600 in FIGS. 6A and 6B). The electromagnetic field detector can be, for example, a toroidal waveguide (such as the toroidal waveguide 700 shown in FIGS. 7A and 7B).

The electromagnetic field detector can be, for example, an atomic clock oscillator where time dilation due to oscillation variances caused by gravitational waves versus a reference distance clock can be used to indicate gravitational wave train power.

Additionally or alternatively, the electromagnetic field detector can be, for example, a condensed matter detector where gravitational waves passing through the detector brings a phase state of a material to maximum criticality where a phase transition occurs.

Additionally or alternatively, the electromagnetic field detector can be, for example a decoherence detector that detects decoherence of entangled quantum bits, and the decoherence is caused by gravitational waves.

The wave sensor 151 can include a gravitational detector that detects a non-uniform angular velocity to detect a gravitational field component in the gravitational wave signals.

Figure 9:
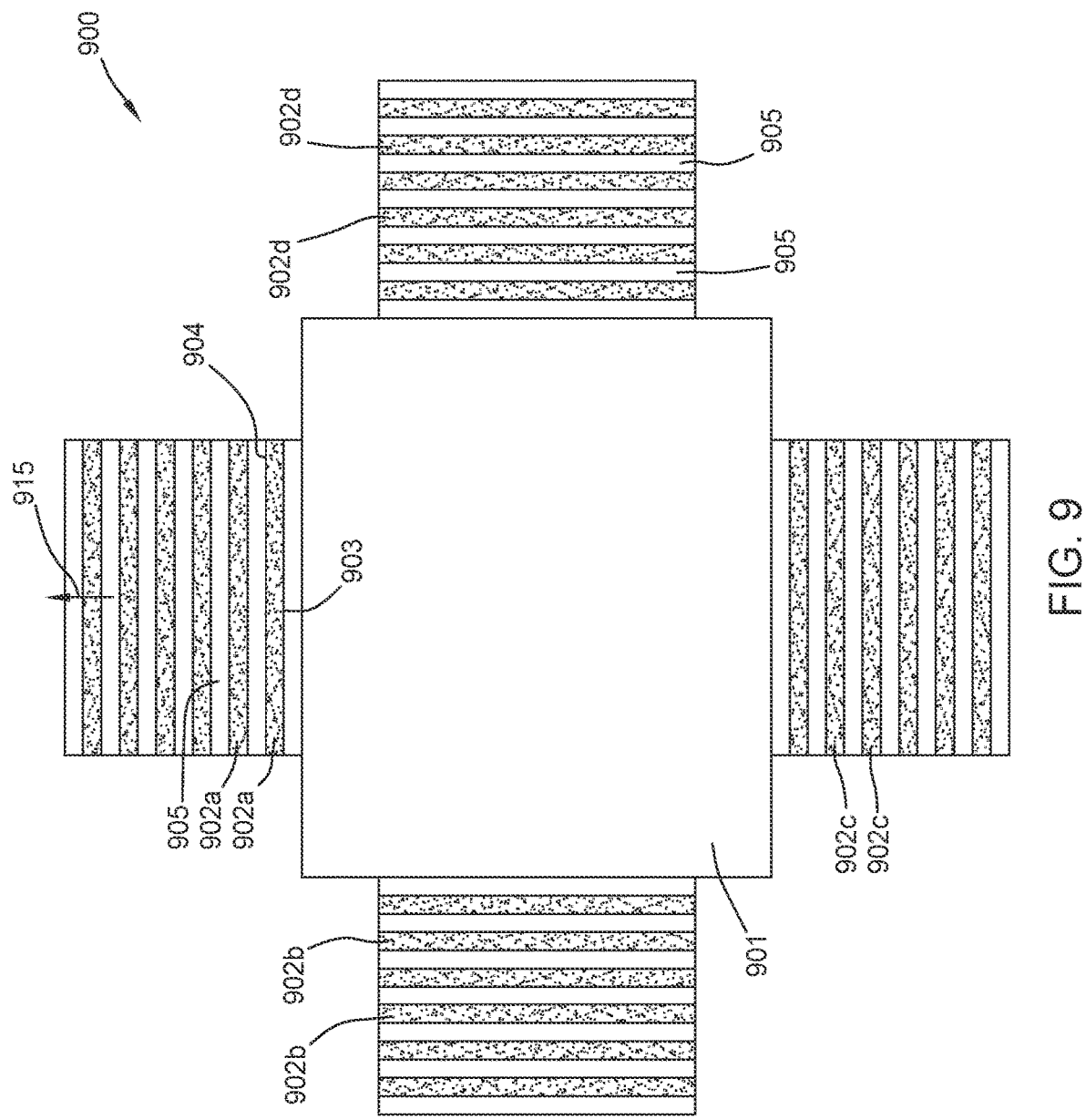
FIG. 9 is a schematic cross-sectional view of a photoamplifier detector, according to one or more embodiments.

The wave sensor 151 can include a photoamplifier detector (such as the photoamplifier detector 900 shown in FIG. 9).

In one or more embodiments, the wave sensor 151 includes two fiber optic coils arranged such that the linear axis of the two-coils are oriented in an L-shape with respect to each other. The present disclosure contemplates that the fiber optic coils of the wave sensor 151 can be oriented in a manner as an interferometer, such as a laser interferometer gravitational-wave observatory (LIGO) device. In one or more embodiments, detection legs of the LIGO device have a length that is at least one kilometer, such as about four kilometers. A smaller length is contemplated. The present disclosure contemplates that the coherence levels for the wave signals 101 can be increased (e.g., more similar) the farther apart the transmitter 110 and the receiver 150 are from each other, and the coherence levels for the wave signals 101 can be decreased (e.g., less similar) the closer the transmitter 110 and the receiver 150 are to each other.

The transmitter 110 can be at a first site and the receiver 150 can be at a second site. The first site can also include a receiver (similar or identical to the receiver 150) and the second site can also include a transmitter (similar or identical to the transmitter 110) such that the first site and the second site each function as a transceiver.

The system 100 includes one or more controllers 113, 153 that include instructions that, when executed, cause a plurality of operations to be conducted. The one or more controllers 113, 153 are configured to at least partially automatically control the system 100 and/or at least partially automatically conduct one or more operations described herein.

The operations can include, for example, one or more of the operations of the method 200 described below, one or more of the operations of the method 1300 described below, and/or one or more of the operations described below in relation to FIGS. 14-17. A first controller 113 of the transmitter 110 controls components and/or operations of the transmitter 110. A second controller 153 of the receiver 150 controls components and/or operations of the receiver 150. In the implementation shown in FIGS. 1A and 1B, the one or more controllers 113, 153 are coordinating controllers and can conduct error correction in signal processing (such as quantum error correction and/or error correction using a data acquisition (DAQ) system, for example a DAQIeq system). The error correction can correct for noise and/or drift.

The system 100 includes one or more motor controllers 117 (such as motor RPM encoders) in communication with the one or more motors 111. In one or more embodiments, the one or more motor controllers 117 are servo controllers. The one or more motor controllers 117 are configured to modulate one or more of a frequency and/or an amplitude of a rotation speed of the one or more rotatable masses 111. The one or more motor controllers 117 are configured to alter an orientation of the one or more rotatable masses 111.

The transmitter 110 includes a global positioning system (GPS) module 115 and/or the receiver 150 includes a second GPS module 127 configured to communicate with a GPS satellite. The system 100 includes a predictive targeting system (PTS), and the PTS includes a transmitter PTS module 116, and a receiver PTS module 155 in wireless communication with the transmitter PTS module 116. The transmitter PTS module 116 and the receiver PTS module 155 are each configured to generate and receive one or more radiofrequency (RF) electromagnetic field (EMF) waves 119. Alignment operations are used to better align the wave sensor 151 with the one or more rotatable masses 111 to increase the signal strength of the gravitational waves 101 received by the wave sensor 151 of the receiver 150. In one or more embodiments, beam communications of the GPS module 115 and/or the second GPS module 127 are used to align the transmitter 110 and the receiver 150. In such an embodiment, the GPS module 115 and/or the second GPS module 127 can be used for alignment initialization, and then communications between the PTS modules 116, 155 can be used for subsequent and ongoing alignment throughout communication between the transmitter 110 and the receiver 150. In one or more embodiments, the GPS module 115 and/or the second GPS module 127 can be omitted, and alignment initialization can be conducted using communications between the PTS modules 116, 155.

In such an embodiment, known information is used for subsequent and ongoing alignment throughout communication between the transmitter 110 and the receiver 150. Known information can include, for example, orbital speed (s) of the transmitter 110 and/or the receiver 150, rotation speed(s) of the planet(s) on which the transmitter 110 and/or the receiver 150 are disposed, and/or rotation speed(s) of nearby known object(s) that are adjacent to the transmitter 110 and/or the receiver 150.

The transmitter 110 includes one or more internal sensors 121 configured to measure one or more of a rotation speed of the one or more rotatable masses 111 or a vibration of the transmitter 110. In one or more embodiments, the one or more internal sensors 121 are configured to measure the orientation of the one or more rotatable masses 111. The one or more internal sensors 121 can measure other factors for the transmitter 110. One or more second sensors 122 can measure parameters (such as environmental factors), for example temperature, pressure, and/or humidity. The sensors 121, 122 can include for example accelerometers, magnetometers, air flow monitors, position monitoring sensors, environmental temperature sensors (such as thermocouples), humidity sensors, barometric pressure sensors, and/or component (e.g., motor) temperature sensors to facilitate signal accuracy. The sensors 121, 122 can be used to reduced or eliminate noise from a signal. Passive components, such as dampers, vacuum systems, and/or suspension systems can be used to reduce or eliminate noise effects. The present disclosure contemplates that other sensors may be used. The receiver 150 can include similar sensors 121, 122. In one or more embodiments, the one or more internal sensors 121 of the receiver 150 are configured to measure the orientation of the wave sensor 151.

The receiver 150 can include one or more sensor controllers 177 (such as servo controllers) in communication with the wave sensor 151. The one or more sensor controllers 177 can be similar to the one or more motor controllers 117. In one or more embodiments, the one or more sensor controllers 177 are configured to alter an orientation of the wave sensor 151.

The transmitter 110 includes feedback control(s) 123 that measure the one or more gravitational waves 101 simultaneously with the transmission of the one or more gravitational waves 101. In one or more embodiments, such as by using the feedback control(s) 123, the one or more internal sensors 121 are configured to measure a coherence level of the outgoing one or more gravitational wave signals 101. The transmitter 110 includes a signal encoder 124 that encodes information of an incoming signal 125. The information can include, for example, words of a message. The first controller 113 can use an encoded signal (e.g., from the signal module 136) to dynamically adjust the acceleration of the rotatable masses 111 to match the intended signal (e.g., from the signal module 136) such that the encoded signal is transmitted into the form of one or more gravitational wave signals 101. In one or more embodiments, the information is encoded into the one or more gravitational wave signals 101 in the form of wave frequency and/or wave amplitude.

The feedback control(s) 123 (e.g., one or more wave samplers) collect information on the outgoing one or more gravitational wave signals 101. Information collected by the feedback control(s) 123 can include coherence levels, signal direction, amplitude, frequency, and/or focus. The information is sent back to the first controller 113 for signal optimization.

The incoming signal 125 can be transmitted by a first device 131 to the transmitter 110. In one or more embodiments, the first device 131 is a user device (such as a computer and/or a mobile device).

The receiver 150 outputs an outgoing signal 170, and the outgoing signal 170 includes information extracted from the one or more gravitational waves 101. In one or more embodiments, the receiver 150 is part of a base transceiver, and the base transceiver is in wireless communication with the transmitter 110 and a wireless electromagnetic (EM) communication system in a bridge configuration. In one or more embodiments, the receiver 150 is part of a local router, such as a WiFi router.

Each controller 113, 153 includes an alignment module 135 (which stores alignment information, such as from the PTS modules 116, 155), and a signal module 136 (which stores signal information, such as the encoded signal(s) to be transmitted to the receiver 150 and/or the encoded signal(s) to be outputted to a user device). The receiver 150 includes a signal processor 157 that processes the one or more gravitational waves 101 received by the wave sensor 151, such as by filtering and/or converting the one or more gravitational waves 101 (e.g., by removing noise from the signals). The receiver 150 includes a decoder 158 that decodes (e.g., extracts) the information that was encoded into the one or more gravitational waves 101.

The signal processor 157 and/or the decoder 158 can remove noise from an encoded signal using a detected noise level. The noise level can be detected, for example, using measurements measured by the sensors 121, 122. The removal of the noise, for example, can clean and/or amplify the signal. The removal of noise can use for example, a known signal direction, a known signal frequency, and/or a known signal amplitude that are known from the transmitter 110. The noise can be caused, for example, by temperature fluctuations, vibration, and/or other movement.

In one or more embodiments, the decoder 158 runs a stochastic model continuously to detect a noise level (e.g., when the receiver 150 is not receiving a signal), and the noise level can be used to remove noise from an encoded signal such that the information can be decoded from the signal. In one or more embodiments, the decoder 158 is used to remove remaining noise that is not removed by the signal processor 157.

The receiver 150 can include one or more coherence detectors 156 used in addition to or in place of the wave sensor 151. The one or more coherence detectors 156 can be integrated with the wave sensor 151. The one or more coherence detectors 156 each include a plurality of resonate microwave cavities, and the gravitational waves 101 are guided through the resonate microwave cavities such that a plurality of electromagnetic (EM) frequencies of the gravitational waves 101 can be measured to analyze coherence of the gravitational waves 101.

The system 100 can include features that shield the system 100 from environmental factors. As an example, low pressure, negative pressure, regulated vibration dampener pressure management, temperature control, electromagnetic shielding (such as faraday cage devices), and/or celestial filtering systems may be used in relation to component(s) of the system 100.

The components of the system 100 can be controlled all automatically, all manually, or partially automatically and partially manually. The operations described herein (such as the operations of the method 200, the operations of the method 1300, and/or the operations described in relation to FIGS. 14-17) can be conducted all automatically, all manually, or partially automatically and partially manually.

In one embodiment, which can be combined with other embodiments, the controller(s) of the system 100 are configured to automatically conduct one or more operations of the method 200, one or more operations of the method 1300, and/or one or more operations described in relation to FIGS. 14-17. Each controller can include a central processing unit (CPU). A memory containing instructions and/or information, and support circuits for the CPU. The controller(s) control the components of the system 100 directly, or via other computers and/or controllers. The present disclosure contemplates that the controllers of the system 100 can be integrated into a single controller, and/or can each individually be in communication with a central controller.

The controller(s) are each of any form of a general-purpose computer processor that is used in an industrial setting for controlling various measurement equipment, and sub-processors thereon or therein. The memory, or non-transitory computer readable medium, is one or more of a readily available memory such as random access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)), read only memory (ROM), floppy disk, hard disk, flash drive, or any other form of digital storage, local or remote. The support circuits are coupled to the CPU for supporting the CPU (a processor). The support circuits include cache, power supplies, clock circuits, input/output circuitry and subsystems, and the like. Operational parameters and/or measurement information and operations are stored in the memory as a software routine that is executed or invoked to turn each controller into a specific purpose controller to control the operations of the system 100. Each controller is configured to conduct any of the operations of the methods described herein. The instructions stored on the memory of the controller(s), when executed, cause one or more of operations of method 200, one or more operations of the method 1300, and/or one or more operations described in relation to FIGS. 14-17 to be conducted.

The various operations described herein (such as the operations 202-208 of the method 200, such as the operations 1302-1310 of the method 1300, and/or the operations described in relation to FIGS. 14-17) can be conducted automatically using the controller(s), or can be conducted automatically or manually with certain operations conducted by a user.

Figure 2:
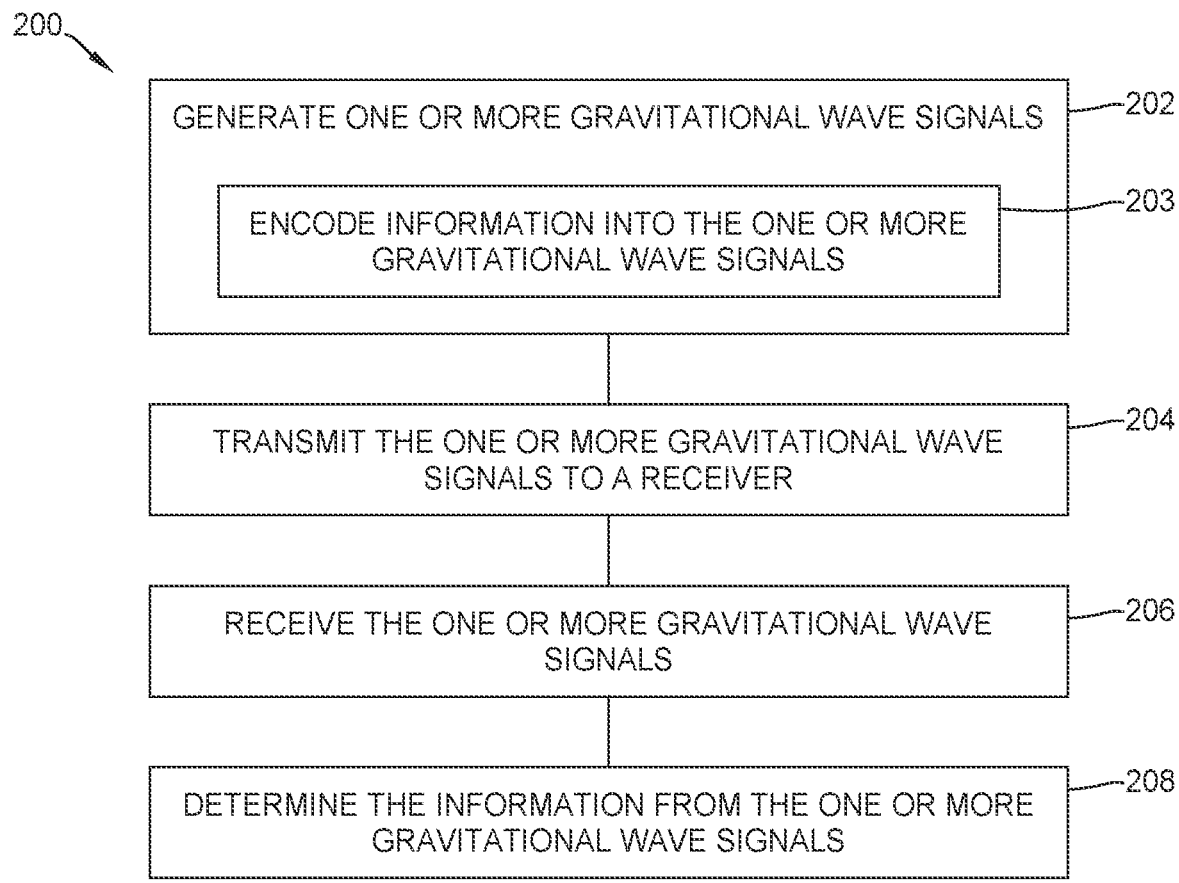
FIG. 2 is a schematic diagram view of a method of wireless gravitational wave communication, according to one or more embodiments.

FIG. 2 is a schematic diagram view of a method 200 of wireless gravitational wave communication, according to one or more embodiments.

Operation 202 of the method 200 includes generating one or more gravitational wave signals at a first site. The generating of the one or more gravitational wave signals includes accelerating one or more rotatable masses at a plurality of states. In one or more embodiments, operation 202 includes applying angular acceleration to a baseline angular velocity of the one or more rotatable masses causes an additive or subtractive spacetime curvature component due to radial dilation of the one or more rotatable masses. The additive or subtractive field component represents a controllable increase or decrease in the gravitational field caused by a distortion of surrounding spacetime in response to the changing radial kinetic energy of the one or more rotatable masses that are rotating. In one or more embodiments, the additive or subtractive field component is a gravitational field component at a right angle. In one or more embodiments (and at operation 203), operation 202 includes encoding information into the one or more gravitational wave signals. The one or more gravitational wave signals can be generated by applying a variety of angular acceleration modes such that the signals (until changed, e.g., modulated) during a period of angular acceleration have a similar wave form, frequency, amplitude, and/or phase (e.g., coherence) representing the information encoded into the one or more gravitational wave signals. New information is encoded by changing acceleration modes after a period of angular acceleration is completed. In one or more embodiments, the one or more gravitational wave signals include a plurality of gravitational wave signals that are at least semi-coherent (such as substantially coherent) with each other. In one or more embodiments, the one or more gravitational wave signals are generated across a plurality of coherence levels. In one or more embodiments, the one or more gravitational wave signals have a velocity that is substantially equal to (such as within a difference of 5% or less) the speed of light. In one or more embodiments, the one or more gravitational wave signals have a wavelength that is within a range of 2E5 meters to 6E5 meters. In one or more embodiments, the one or more gravitational wave signals have a frequency that is within a range of 0 hertz to 1,700 hertz, such as within a range of 500 hertz to 1,700 hertz. In one or more embodiments, the one or more gravitational wave signals have a beam waist diameter that is within a range of 0.0010 meters to 0.0030 meters. In one or more embodiments, the first rotatable mass(es) have a tangential velocity at an outer diameter than is within a range of 11 meters per second to 90.88 meters per second, such as higher than 11 meters per second. In one or more embodiments, the one or more gravitational wave signals have an aggregate beam energy that is greater than 6E-11 Joules, such as within a range of 6E-11 Joules to 10E-10 Joules.

In one or more embodiments, the generating of the one or more gravitational wave signals includes modulating one or more of an amplitude or a frequency of the one or more gravitational signals. In one or more embodiments, the generating includes forming the one or more gravitational wave signals into beams.

In one or more embodiments, at least one of the plurality of states is a stationary state for the one or more rotatable masses, and at least one of the plurality of states is a spinning state. In one or more embodiments, the plurality of states include a plurality of spinning states having variable rotation speeds for the one or more rotatable masses. The generating of the one or more gravitational wave signals includes modulating the variable rotation speeds, such as by using changing states of angular acceleration of the one or more rotatable masses. In one or more embodiments, the rotation speeds are accelerated and/or decelerated. The variable rotation speeds can be within a range of 0.1 RPM (rotations-per-minute) to 100,000 RPM, such as 0.1 RPM (rotations-per-minute) to 40,000 RPM, for example within a range of 0.1 RPM to 32,000 RPM. In one or more embodiments, the rotation speed(s) of the one or more rotatable masses are modulated by a step that is within a range of 1 RPM per second to 1,000 RPM per second, such as about 100 RPM per second. In one or more embodiments, the rotation speed(s) of the one or more rotatable masses are accelerated at an acceleration rate within a range of 1 RPM per second to 1,000 RPM per second, such as about 100 RPM per second. In one or more embodiments, the one or more rotatable masses are accelerated in a first period at an acceleration rate, and then decelerated in a second period at a deceleration rate, where the deceleration rate is equal to the acceleration rate. In one or more embodiments, the generating of the one or more gravitational wave signals includes amplifying the one or more gravitational waves by altering an orientation of the one or more rotatable masses to create an effective constructive wave interference pattern. In one or more embodiments, the one or more rotatable masses are varied across one or more of the variable rotation speeds or a plurality of orientations to generate the one or more gravitational waves in the form of a soliton wave.

The generating of the one or more gravitational wave signals includes encoding the information into the one or more gravitational wave signals.

In one or more embodiments, the generating of the one or more gravitational wave signals (at operation 202) includes amplifying the one or more gravitational waves by rotating one or more second rotatable masses about a guide axis that is oriented tangentially to a generation axis about which the one or more rotatable masses are oriented.

Operation 204 includes transmitting the one or more gravitational wave signals to a receiver in a wireless manner. In one or more embodiments, the one or more gravitational wave signals are transmitted through earth and to the receiver. The one or more gravitational wave signals can be transmitted through other barriers, such as the moon, storms, solar wind, and/or structural barriers. The one or more gravitational wave signals are isotropic, follow a geodesic trajectory, and travel substantially at the speed of light from the transmitter and to the receiver.

Operation 206 includes receiving the one or more gravitational wave signals at a second site using the receiver.

Operation 208 includes determining the information from the one or more gravitational wave signals. The determining of the information includes decoding the one or more gravitational wave signals to extract the information that was encoded into the one or more gravitational wave signals. In one or more embodiments, the information is decoded in the reverse of how the information was encoded into the one or more gravitational wave signals. In one or more embodiments, the determining of the information includes identifying one or more settled baselines of the one or more gravitational wave signals.

Figure 3:
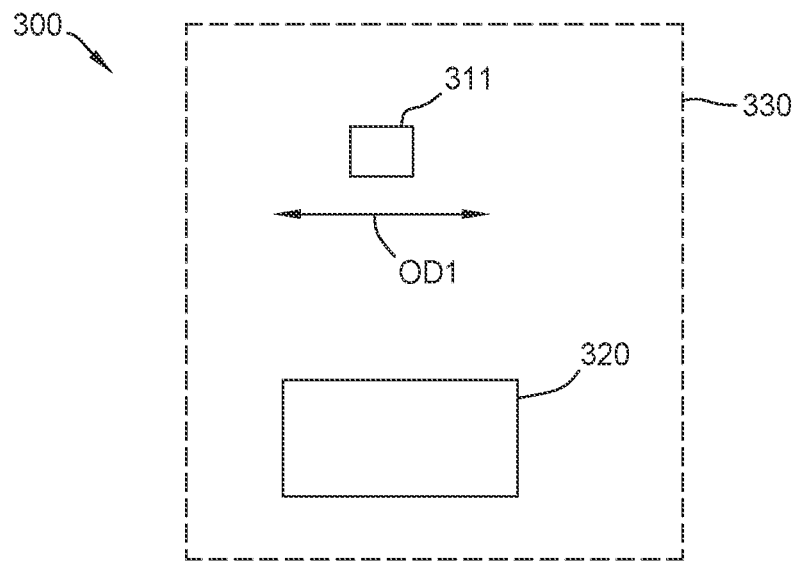
FIG. 3 is a schematic view of a chip-scale atomic clock (CSAC), according to one or more embodiments.

FIG. 3 is a schematic view of a chip-scale atomic clock (CSAC) 300, according to one or more embodiments. In the implementation shown in FIG. 3, the target includes a target atom 311 that is configured to oscillate along an oscillation direction OD1. A detector 320 is included that is configured to detect an oscillation frequency of the target atom 311. The detector 320 is positioned within a housing 330.

The target atom 311 is formed of caesium (Cs). The present disclosure contemplates other materials for the target atom 311.

A plurality of oscillation frequencies of the target atom 311 are measured while the one or more rotatable masses 111 are spinning at various rotation speeds. The spinning oscillation frequencies correlate to a spinning target motion of the target atom 311. The oscillation frequencies can be correlated to known data (e.g., a reference clock) to extract information from the one or more gravitational wave signals 101. The information can indicate a time relative to the reference clock. The oscillation frequencies can correlate to time dilation effects that are caused by one or more gravitational wave signals 101 propagating in relation to the target atom 311. In the context of a CSAC embodiment, a time dilation effect is measured.

In one or more embodiments, the known data includes oscillation frequency measurements taken using other CSAC's (such as other CSAC's located at the same site as the wave sensor 151 or at other sites). In one or more embodiments, the oscillation frequencies are compared with other CSAC devices (e.g., oscillators) located at the same site and other stable time reference sources to determine the amount of time dilation effect observed by the detector 320 over time. In one or more embodiments, time dilation effect observed by the detector 320 is correlated to gravitational influence due to special relativity in order to determine the measure the one or more gravitational wave signals 101. The measurements can account for the effects that the closer the target atom 311 is to the rotatable masses 111 the slower time passes for the target atom 311 and the detector 320; and the farther the target atom 311 is from the rotatable masses 111, the faster time passes for the target atom 311 and the detector 320.

The present disclosure contemplates that the CSAC 300 can be used as at least part of the receiver 150. For example, the CSAC 300 can be used as at least part of the wave sensor 151.

Figure 4:
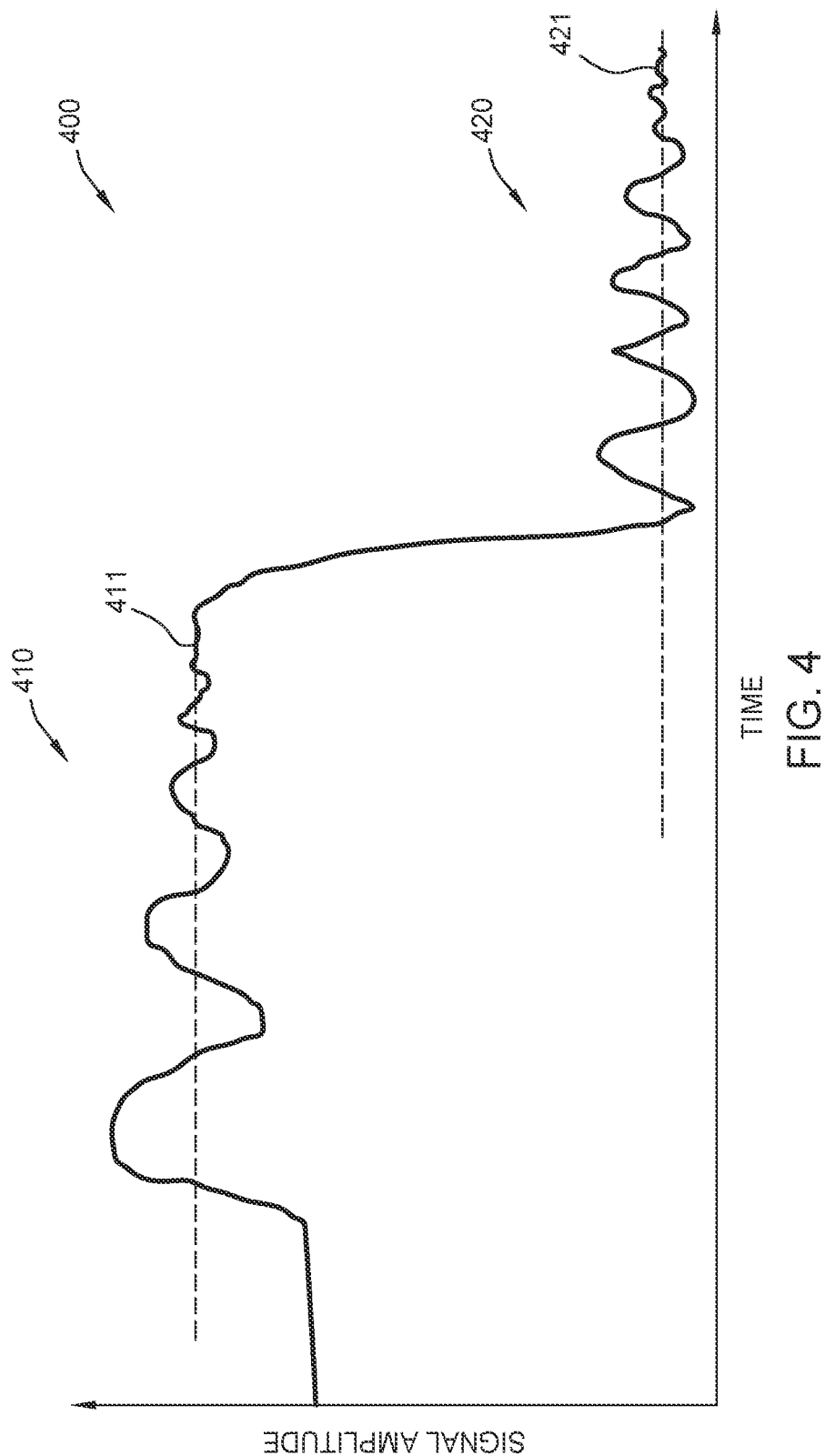
FIG. 4 is a schematic graphical view of a graph showing signal amplitude versus time during communication operations, according to one or more embodiments.

FIG. 4 is a schematic graphical view of a graph 400 showing signal amplitude versus time during communication operations, according to one or more embodiments. The signal amplitude shows the amplitudes of two gravitational wave signals 410, 420.

FIG. 4 shows a first settled baseline 411 of the first gravitational wave signal 410 and a second settled baseline 421 of the second gravitational wave signal 420.

FIG. 5 is a schematic perspective view of a rotatable mass 500, according to one or more embodiments. The rotatable mass 500 includes a multi-alloy mass having a varying mass distribution. The multi-alloy mass can include a quadrupole distribution of masses 502 (e.g., mass cylinders formed of tungsten) embedded in an aluminum disk 504. The rotatable mass 500 includes a plurality of slots 506 formed in the disk 504 in a quadrupole distribution that is alternating with the masses 502. In one or more embodiments, the masses 502 and the slots 506 are disposed along a first circumference 508 and a second circumference 509 of the disk 504. In one or more embodiments, the slots 506 are cylindrical in shape. The first circumference 508 is disposed at a first radius RA1 and the second circumference 509 is disposed at a second radius RA2 that is larger than the first radius RA1. The aluminum disk 504 has a thickness TH1. The rotatable mass 500 is optional. For example, angular acceleration of a rotatable mass can be used with or without the rotatable mass 500.

FIGS. 6A and 6B are schematic side views of a microwave cavity detector 600, according to one or more embodiments. Gravitation waves 601 are incident on a cavity 602 of an enclosure 604 (e.g., a sleeve), and the gravitation waves 601 induce harmonics 606 in the enclosure 604, as shown in FIG. 6A. As shown in FIG. 6B, super conducting electrons contained on a surface manifold in the cavity 602 of the enclosure 604 move to cause a current flow 610 (e.g., an eddy current) in response to harmonics 606 (e.g., changes in spacetime) induced in the enclosure 604 by the incident gravitation waves 601.

Figure 7B:
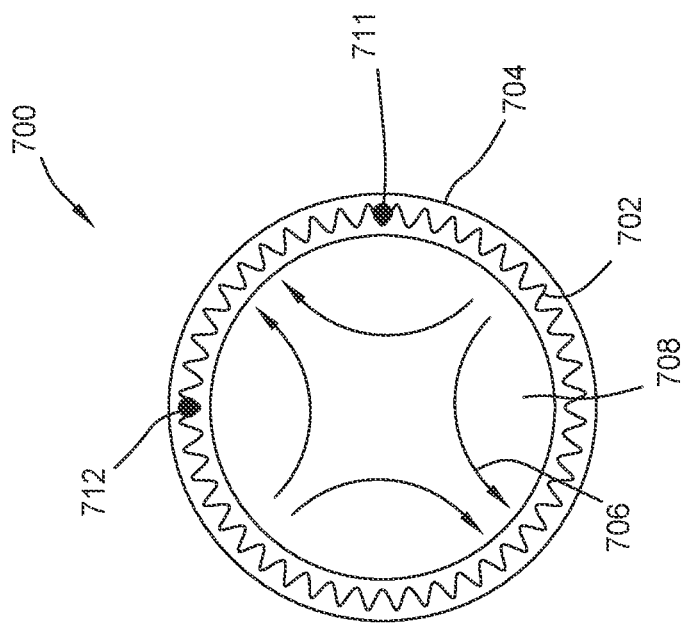
FIGS. 7A and 7B are schematic cross-sectional views of a toroidal waveguide, according to one or more embodiments.
Figure 7A:
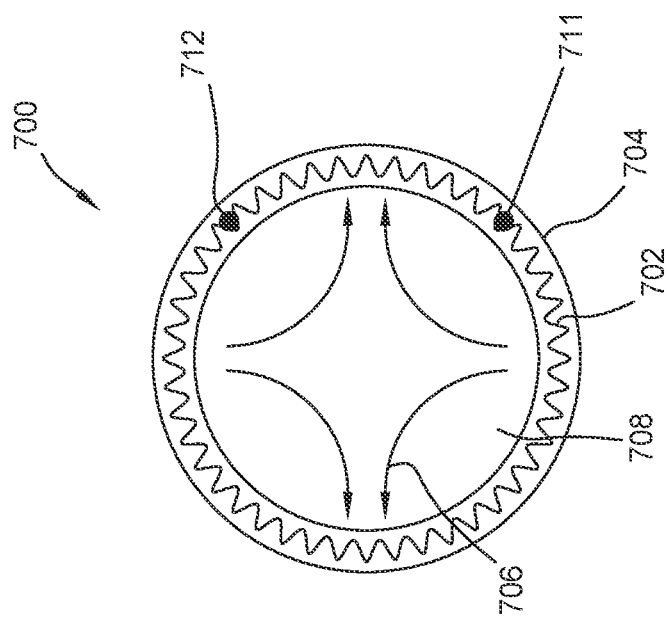

FIGS. 7A and 7B are schematic cross-sectional views of a toroidal waveguide 700, according to one or more embodiments. In the toroidal waveguide 700, electromagnetic waves 702 propagate in a tube 704 surrounding a Torus 706. Gravitational waves travel through a central opening 708 of the tube 704 perpendicular to the toroidal plane and distort the shape of the tube 704, thereby imparting an oscillating blue shift 711 and an oscillating red shift 712 of the electromagnetic waves 702 in the tube 704. The amount of shift could be measured by a radiometer, spectrometer, and/or wave-meter.

FIG. 7A shows a point in time where an angular speed of the electromagnetic waves 702 multiplied by a frequency of the electromagnetic waves 702 is equal to zero. FIG. 7B shows a point in time where an angular speed of the electromagnetic waves 702 multiplied by a frequency of the electromagnetic waves 702 is equal to ($\pi/2$).

Figure 8:
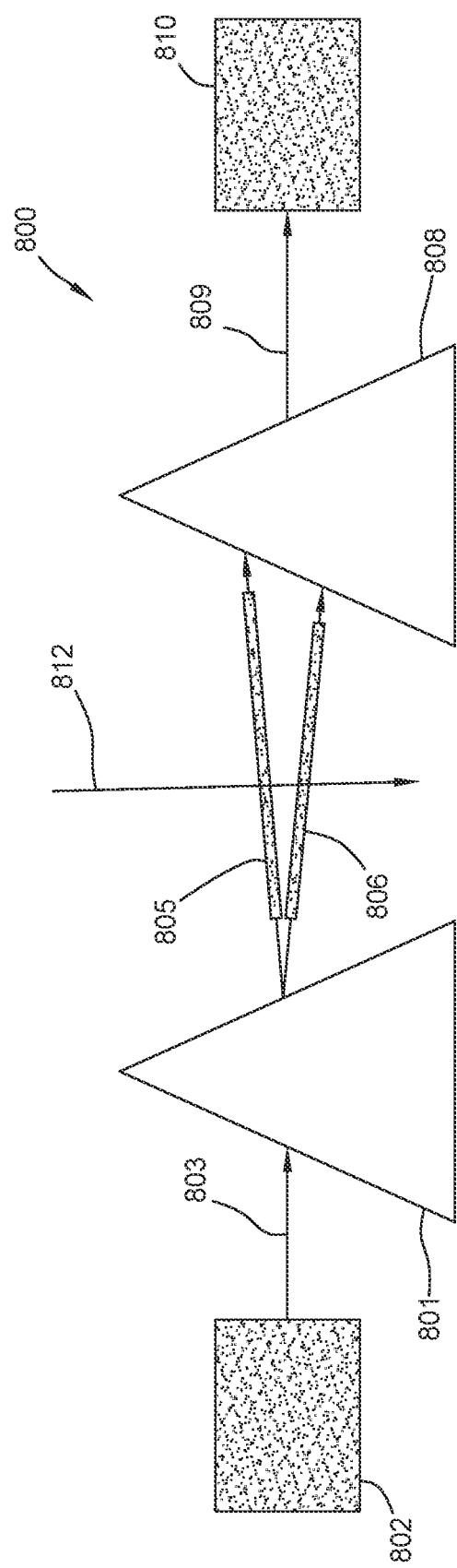
FIG. 8 is a schematic side view of a fiber optic detector, according to one or more embodiments.

FIG. 8 is a schematic side view of a fiber optic detector 800, according to one or more embodiments. The fiber optic detector 800 includes a light source 802, a beam splitter 804 that receives a light beam 803 from the light source 802 and splits the light into two separate fiber optic cables 805, 806, and a beam combiner 808 re-combines the light 809 and passes the light 809 to a light detector 810. In one or more embodiments, the beam splitter 804 and/or the beam combiner 808 include at least one mirror, such as at least one dichroic mirror. One or more processors determine changes in properties of light 803 through the fiber optic cable(s) 805, 806 by measuring changes in wavelength, phase, polarization direction, and/or intensity of the light 803 while gravitational waves 812 pass through the detector 800. As an example, gravitational waves 812 passing through a fiber optic core can be analyzed while adjusting a core radius according to the formula of: light propagation velocity=($\frac{1}{2}$) *light angular velocity*core radius. The gravitational waves 812 cause a shift in the light wavelength as red and blue shifts. The light wavelength can be, for example 850 nm, 1300 nm, and/or 1550 nm. In one or more embodiments, the fiber optic cables 805, 806 include opposing coils, and the Sagnac effect is used to detect changes in spacetime.

FIG. 9 is a schematic cross-sectional view of a photoamplifier detector 900, according to one or more embodiments. The photoamplifier detector 900 includes a cavity 901 surrounded by four stacks of electrically charged plates 902a-902d. Gravitational wave signals propagate through the cavity 901 (e.g., into the page or out of the page in FIG. 9). Each plate includes an inner surface 903 that is positively charged, and an outer surface 904 that is negatively charged. A vacuum gap 905 is disposed between each set of plates 902a-902d, where the inner plate is electrically tuned to release one electron when disturbed by a gravitational wave and each subsequent plate in the stack is tuned to release additional electrons in response to the first electron's release from the inner plate. The result is a cascade of electrons 915 at the outer plate, transforming the gravitational wave signal into an amplified electrical signal for information analysis using one or more electrical circuits for decoding information.

Figure 10:
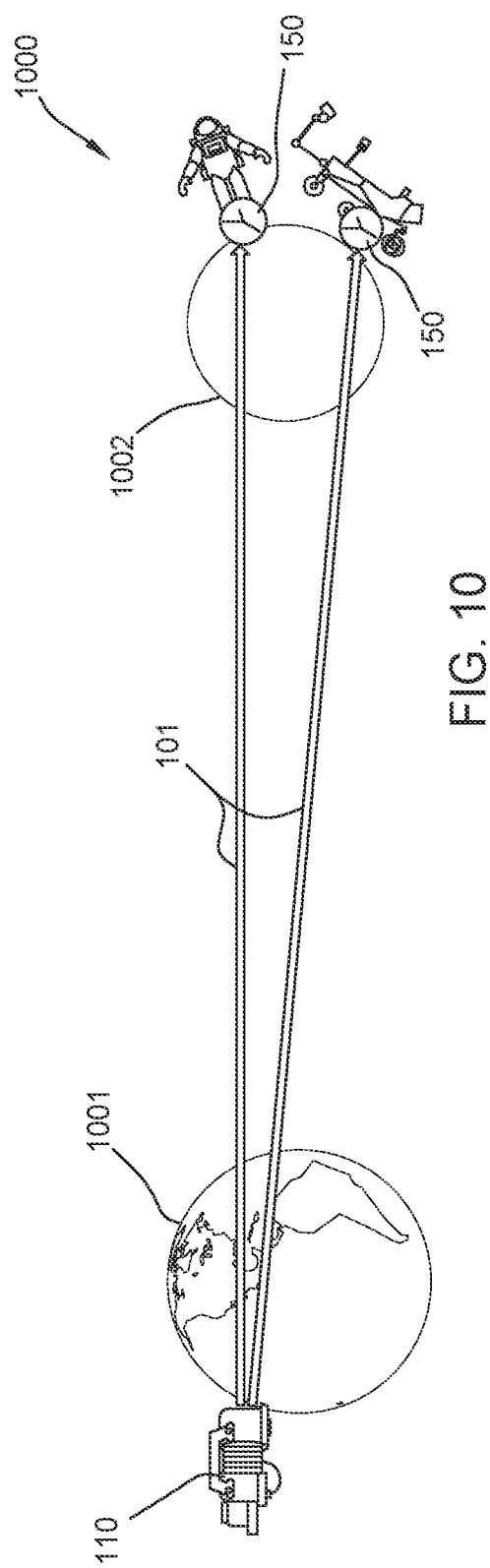
FIG. 10 is a schematic diagram view of a system, according to one or more embodiments.

FIG. 10 is a schematic diagram view of a system 1000, according to one or more embodiments. A transmitter 110 is located on earth 1001 and two receivers 150 are located on another planet 1002 (such as mars). Each receiver 150 includes a CSAC. One receiver 150 can be located on an astronaut and a second receiver 150 can be mounted to a vehicle (such as a rover). The gravitation wave signals 101 are transmitted through earth 1001 and through the other planet 1002.

Figure 11:
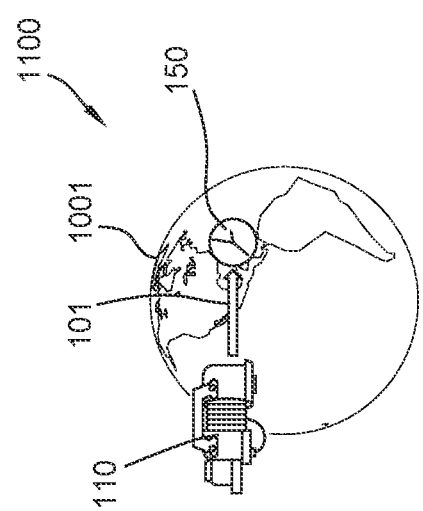
FIG. 11 is a schematic diagram view of a system, according to one or more embodiments.

FIG. 11 is a schematic diagram view of a system 1100, according to one or more embodiments. A transmitter 110 is located on one coast of the United States (e.g., the West coast), and a receiver 150 is located on a second coast of the United States (e.g., the East coast).

Figure 12:
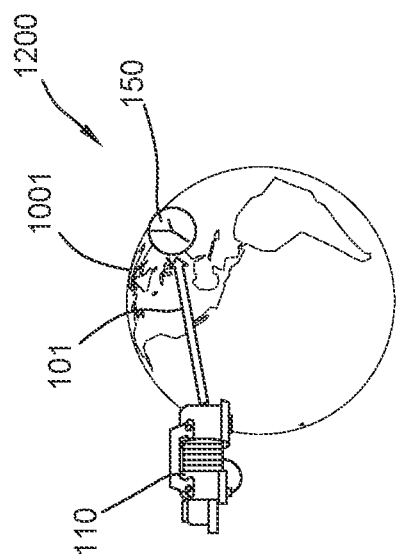
FIG. 12 is a schematic diagram view of a system, according to one or more embodiments.

FIG. 12 is a schematic diagram view of a system 1200, according to one or more embodiments. A transmitter 110 is located in the United States and a receiver 150 is located in a second country (e.g., the United Kingdom) across the ocean from the United States.

Figure 13:
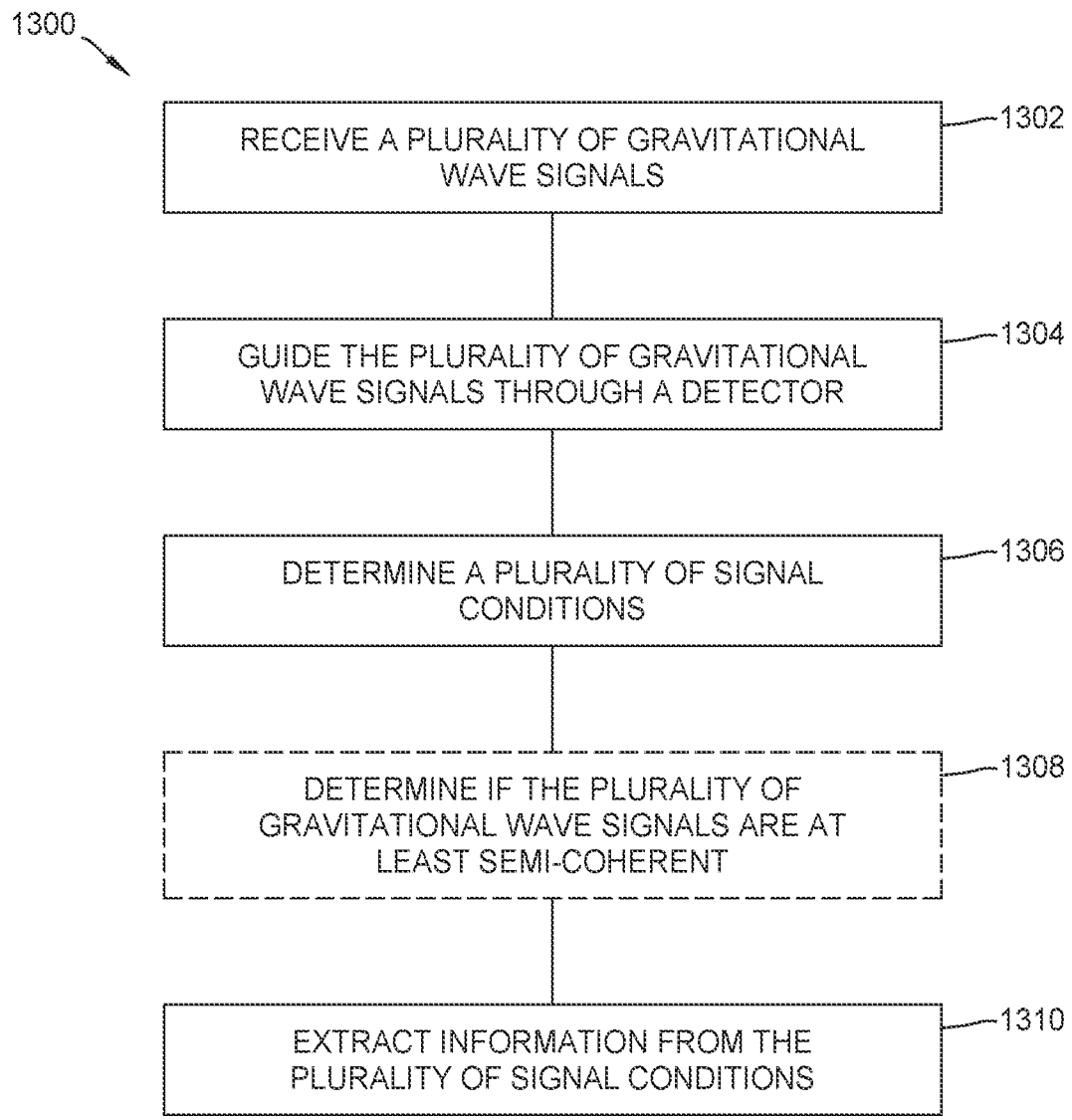
FIG. 13 is a schematic diagram view of a method of gravitational wave measurement, according to one or more embodiments.

FIG. 13 is a schematic diagram view of a method 1300 of gravitational wave measurement, according to one or more embodiments.

Operation 1302 of the method 1300 includes receiving a plurality of gravitational wave signals at a receiver.

Operation 1304 includes guiding the plurality of gravitational wave signals through a detector. In one or more embodiments, the detector includes a plurality of resonate microwave cavities. In one or more embodiments, the gravitational wave signals are guided through the resonate microwave cavities as a series of waves. In one or more embodiments, the plurality of gravitational wave signals are guided in relation to electrical energy that includes one or more of: light, a flow of electrons, and/or electromagnetic waves.

Operation 1306 includes determining a plurality of signal conditions of the plurality of gravitational wave signals propagating through the detector. The plurality of signal conditions include one or more of a plurality of frequencies and/or a plurality of amplitudes. In one or more embodiments, the plurality of frequencies are electromagnetic (EM) frequencies.

Optional operation 1308 includes determining if the plurality of gravitational wave signals are at least semi-coherent (such as substantially coherent) with each other. In one or more embodiments, the determining of operation 1308 includes determining if any of the plurality of EM frequencies (such as a subset of the EM frequencies or an entirety of the EM frequencies) are similar or substantially similar to each other.

Operation 1310 includes extracting information from the plurality of signal conditions.

Figure 14:
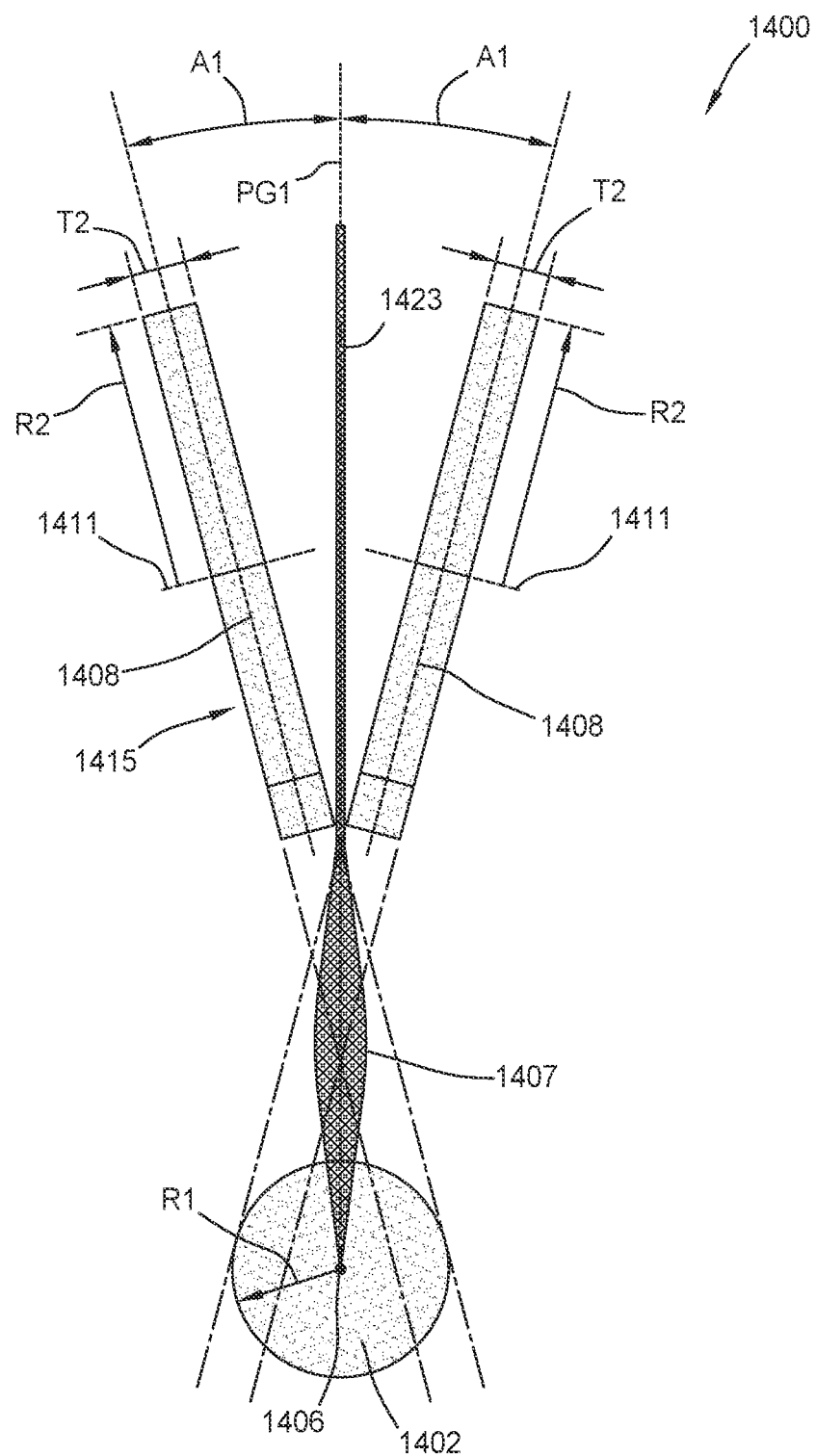
FIG. 14 is a schematic partial top view of a gravitational wave generator, according to one or more embodiments.

FIG. 14 is a schematic partial top view of a gravitational wave generator 1400, according to one or more embodiments.

The gravitational wave generator 1400 includes a first rotatable mass 1402 and one or more wave guide stages (one wave guide stage 1415 is shown in FIG. 14). During operation, the first rotatable mass 1402 rotates about a generator axis 1406 to generate one or more gravitational waves 1407 along a propagation direction PG1 that is orthogonal to the generator axis 1406. Each wave guide stage 1415 includes at least one second rotatable mass 1408 (two are shown in FIG. 14) that is rotated (e.g., spinned) about a respective guide axis 1411. Rotation of the second rotatable masses 1408 creates constrained and controllable gravitational fields that focus the one or more gravitational waves 1407. In one or more embodiments, the focusing of the one or more gravitational waves 1407 collimates the one or more gravitational waves 1407 (which initially propagate radially from the first rotatable mass 1402) into one or more collimated beams 1413 along the propagation direction PG1. In one or more embodiments, the focusing of the one or more gravitational waves 1407 amplifies graviton intensity and collimizes the one or more gravitational waves 1407. The focusing facilitates ease of detecting the one or more gravitational waves 1407 at relatively large distances, phase alignment, and substantially uniform frequencies. The guide axis 1411 is oriented non-parallel to the generator axis 1406. In one or more embodiments, and as shown in FIG. 14, the guide axis 1411 is oriented tangentially to the generator axis 1406. In one or more embodiments, a rotational velocity of the first rotatable mass 1402 is angularly accelerated and rotational velocities of the second rotatable masses 1408 are substantially constant. The present disclosure contemplates that the rotational velocities of the second rotatable masses 1408 can be adjusted (e.g., stepped), such as to optimize focusing. After adjustment, the adjusted rotational velocities of the second rotatable masses 1408 are substantially constant.

In one or more embodiments, the first rotatable mass 1402 is spinnable about the generator axis 1406, and the generator axis 1406 extends through a first center of mass of the first rotatable mass 1402. In one or more embodiments, the second rotatable mass(es) 1408 are each spinnable about the respective guide axis 1411, and the respective guide axis 1411 extends through a second center of mass of the second rotatable mass 1408.

The second rotatable mass(es) 1408 are oriented at a guide angle μl relative to the propagation direction PG1. In one or more embodiments, the guide angle μl is an acute angle. In one or more embodiments, the guide angle μl is within a range of 0 degrees to 180 degrees, such as within a range of 0 degrees to 90 degrees. In one or more embodiments, the guide angle μl is less than 30 degrees, such as less than 20 degrees. In one or more embodiments, the guide angle μl is within a range of 0.1 degrees to 10 degrees. Adjusting the guide angle μl can adjust a focal point of the collimated beams 1413 to adjust the collimation.

The present disclosure contemplates that the first rotatable mass 1402 and the second rotatable masses 1408 each can include any of the rotatable masses described herein. In one or more embodiments, the first rotatable mass 1402 and the second rotatable masses 1408 each include an aluminum disk, a titanium disk, or a tungsten disk. In one or more embodiments, the first rotatable mass 1402 includes the optional rotatable mass 500 shown in FIG. 5. The portions of the gravitational wave generator 1400 (e.g., the first rotatable mass 1402, the second rotatable masses 1408, the guide frames 1405, the generator frame 1412, the drive arm 1514, the first lever arm 1521, the one or more linkages 1524, the second lever arm 1522, the first pin 1526, the second pins 1528, and/or the third pins 1530 described below) can includes one or more of: aluminum, steel, titanium, tungsten, depleted uranium, one or more polymeric materials, and/or one or more composite materials. Other materials, such as other metals, are contemplated. In one or more embodiments, the guides frames 1405 and/or the generator frame 1412 include aluminum and/or steel. In one or more embodiments, the drive arm 1514, the first lever arm 1521, the one or more linkages 1524, and/or the second lever arm 1522 include aluminum. In one or more embodiments, the first pin 1526, the second pins 1528, and/or the third pins 1530 include steel and/or include one or more bushings and/or one or more bearings disposed thereabout.

The first rotatable mass 1402 includes a first thickness T1 (going into the page in FIG. 14) and a first radius R1. The second rotatable masses 1408 include a second thickness T2 and a second radius R2. In one or more embodiments, the first thickness T1 is within a range of 10 mm to 100 mm, the first radius R1 is within a range of 50 mm to 200 mm, the second thickness T2 is within a range of 10 mm to 100 mm, and the second radius R2 is within a range of 50 mm to 200 mm. Other values are contemplated. For example, the first radius R1, the second radius R2, the first thickness T1, and/or the second thickness T2 can each be 500 mm or higher, such as 1 meter or higher, for example several meters or higher.

Figure 15:
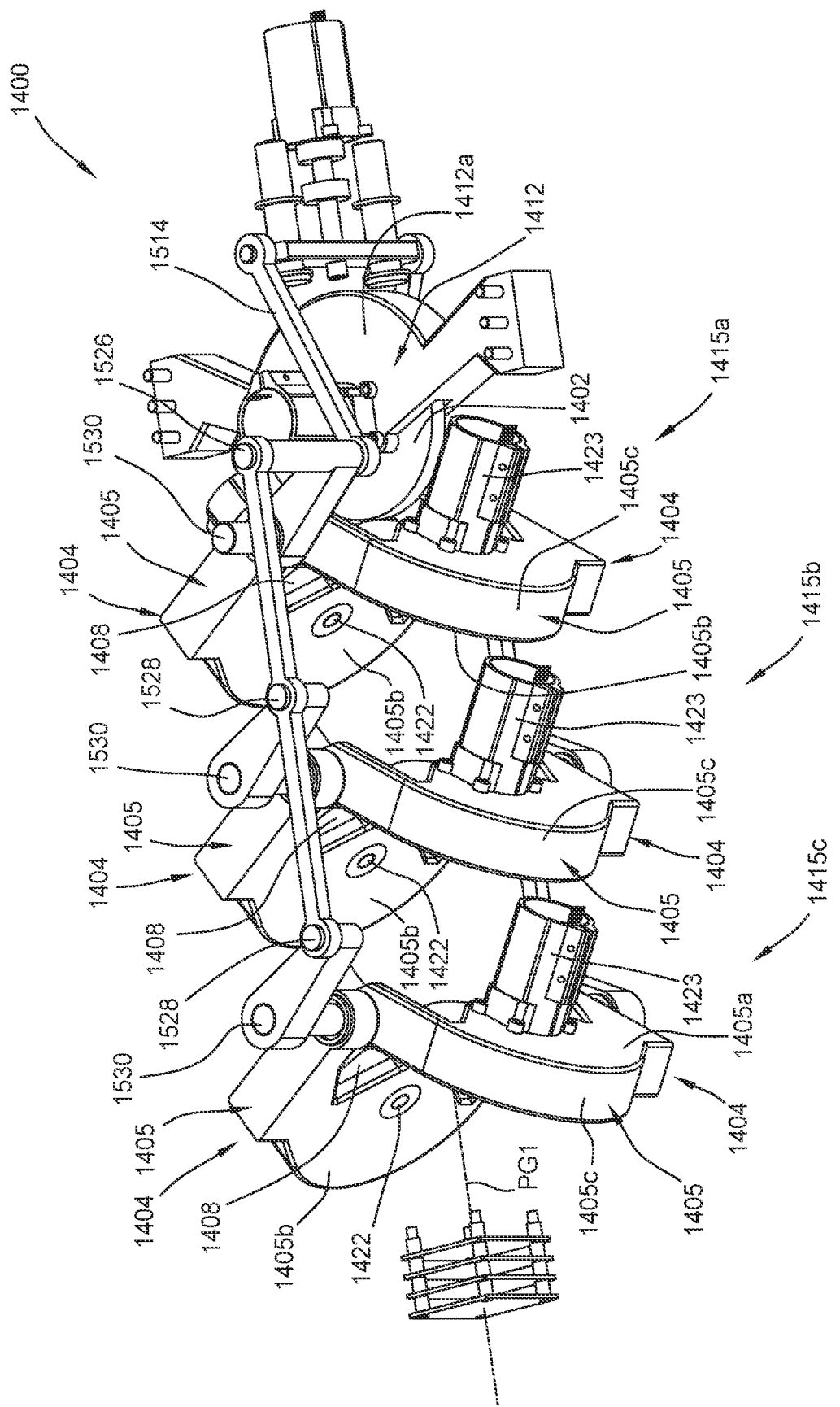
FIG. 15 is a schematic side perspective view of the gravitational wave generator shown in FIG. 14, according to one or more embodiments.
Figure 16:
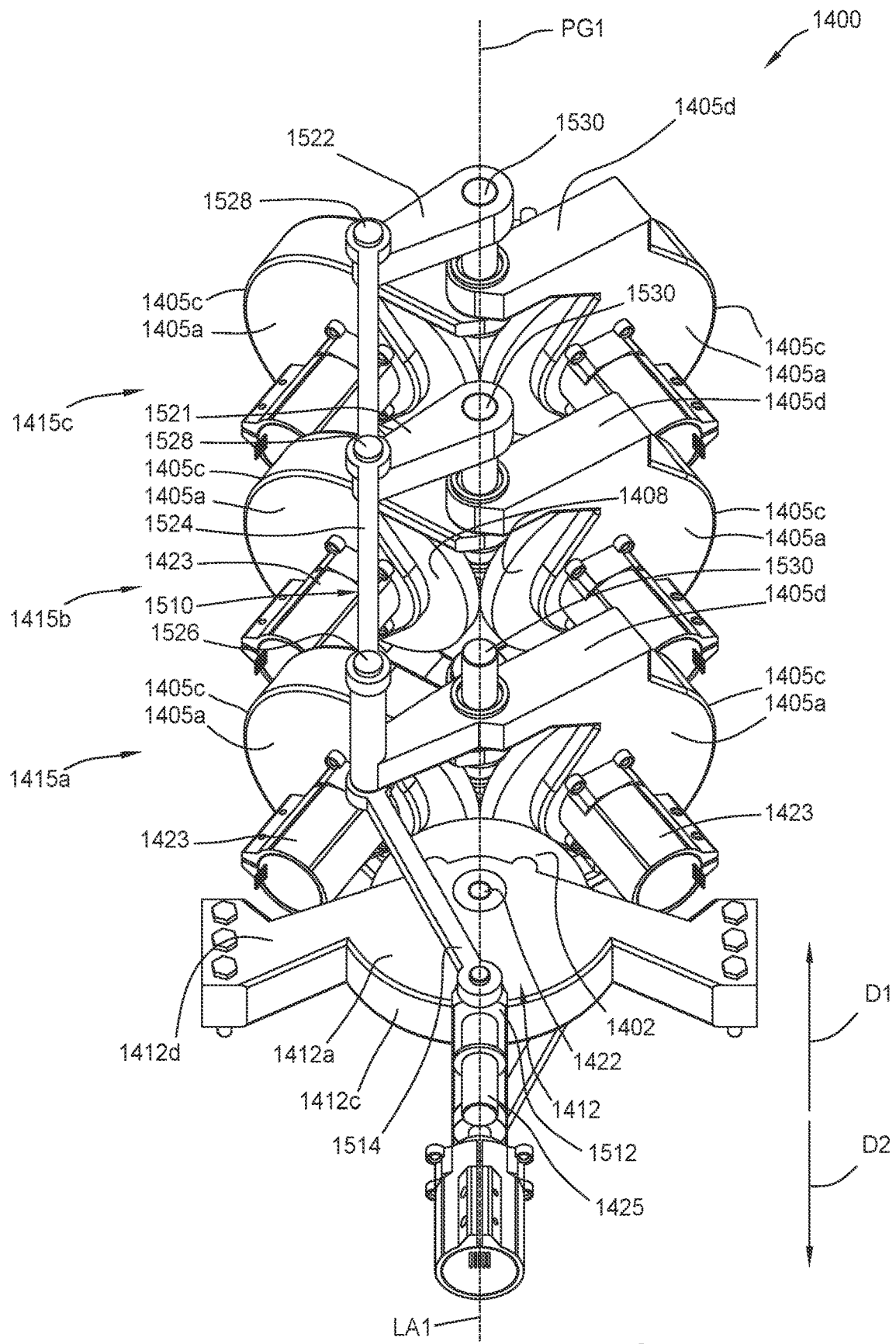
FIG. 16 is a schematic top view of the gravitational wave generator shown in FIG. 15, according to one or more embodiments.

FIG. 15 is a schematic side perspective view of the gravitational wave generator 1400 shown in FIG. 14, according to one or more embodiments. FIG. 16 is a schematic top view of the gravitational wave generator 1400 shown in FIG. 15, according to one or more embodiments.

The gravitational wave generator 1400 includes a generator frame 1412. The first rotatable mass 1402 is mounted to the generator frame 1412, and the first rotatable mass 1402 is rotatable about the generator axis 1406 and is rotatable relative to the generator frame 1412. Each of the one or more wave guide stages 1415 includes two or more guide assemblies 1404 (three wave guide stages 1415, each including two guide assemblies 1404, are shown in FIG. 15). The two or more guide assemblies 1404 each include a guide frame 1405, and the second rotatable mass 1408 is mounted to the guide frame 1405. The second rotatable mass 1408 is rotatable about the guide axis 1411 and is rotatable relative to the guide frame 1405. A generator motor (not shown in FIGS. 15 and 16) is mounted to the generator frame 1412 and is coupled to a generator shaft 1422 extending through the first rotatable mass 1402.

The two or more guide assemblies 1404 each include a guide motor 1423 (one is shown for each) mounted to the guide frame 1405 and coupled to a guide shaft 1424 extending through the second rotatable mass 1408. In one or more embodiments, the guide motors 1423 synchronize the rotation of the second rotatable masses 1408. In one or more embodiments, the generator frame 1412 and the guide frames 1405 each include a pair of side walls 1412a-1412b, 1405a-1405b; a rim wall 1405c, 1412c extending between the side walls 1412a-1412b, 1405a-1405b; a well opening defined at least partially by the rim wall 1405c, 1412c and the side walls 1412a-1412b, 1405a-1405b; and an attachment arm 1405d, 1412d. In one or more embodiments, each of the generator motor and the guide motors 1423 includes an electric motor, such as a servo motor. Other motors are contemplated for the generator motor and the guide motors 1423.

The propagation direction PG1 extends through the rim wall 1412c of the generator frame 1412.

In one or more embodiments, each of the one or more wave guide stages 1415 includes two guide assemblies 1404. In one or more embodiments, the two or more guide assemblies 1404 of each stage are arranged on opposite sides of the propagation direction PG1. In one or more embodiments, each of the one or more wave guide stages 1415 includes a pair of guide assemblies 1404 arranged on opposite sides of the propagation direction PG1. In the implementation shown in FIGS. 15 and 16, the one or more wave guide stages 1415 include at least three wave guide stages (three wave guide stages are shown in FIGS. 15 and 16) arranged in an array along the propagation direction PG1. For example, the one or more wave guide stages 1415 can include a first wave guide stage 1415a of two or more guide assemblies 1404, a second wave guide stage 1415b of two or more guide assemblies 1404 spaced from the first stage 1415a along the propagation direction PG1, and a third wave guide stage 1415c of two or more guide assemblies 1404 spaced from the second stage 1415b along the propagation direction PG1. Using multiple wave guide stages 1415 arranged in an array facilitates focusing larger numbers of gravitational waves into collimated beams, reduced input power, and/or reduced loading of components. In one or more embodiments, the first wave guide stage 1415a includes a first pair of guide assemblies 1404, the second wave guide stage 1415b includes a second pair of guide assemblies 1404, and the third wave guide stage 1415c includes a third pair of guide assemblies 1404.

One or more shafts 1425 are disposed adjacent to the rim wall 1412c of the generator frame 1412. The present disclosure contemplates that the one or more shafts 1425 can be coupled to or spaced from the rim wall 1412c. A longitudinal axis LA1 of at least one of the one or more shafts 1425 are parallel to or coaxial with the propagation direction PG1. In one or more embodiments, and as shown in FIGS. 15 and 16, each of the first rotatable mass 1402 and the second rotatable masses 1408 includes a disc positioned partially in the well opening of the respective generator frame 1412 or guide frame 1405. As shown in FIGS. 15 and 16, the discs are positioned partially in the respective well openings and partially extend outwardly of the respective well openings.

The gravitational wave generator 1400 includes an adjustment assembly 1510 configured to adjust the guide axis 1411 of the two or more guide assemblies 1404. In one or more embodiments, the adjustment assembly 1510 is configured to adjust the guide angle μl relative to the propagation direction PG1. The adjustment assembly 1510 includes a travel block 1512 disposed along at least one of the one or more shafts 1425, and a drive arm 1514 pivotably coupled to the travel block 1512 and pivotably coupled to the guide frame 1405 of one of the two or more guide assemblies 1404 of the wave guide stages 1415. The drive arm 1514 is pivotably coupled to the attachment arm 1405d of one of the two or more guide assemblies 1404 of the first stage 1415a. The adjustment assembly 1510 includes a first lever arm 1521 pivotably coupled to the two or more guide assemblies 1404 of the second stage 1415b, and a second lever arm 1522 pivotably coupled to the two or more guide assemblies 1404 of the third stage 1415c. The adjustment assembly 1510 includes one or more linkages 1524 pivotably coupled to the first lever arm 1521, the second lever arm 1522, and the attachment arm 1405d of the one of the two or more guide assemblies 1404 of the first stage 1415a to which the drive arm 1514 is pivotably coupled. A first pin 1526 is inserted to pivotably couple together the drive arm 1514, the attachment arm 1405d, and the one or more linkages 1524. Second pins 1528 are inserted to pivotably couple together the one or more linkages 1524, the first lever arm 1521, and the second lever arm 1522. The gravitational wave generator 1400 includes third pins 1530. One of the third pins 1530 pivotably couples together the attachment arms 1405d of each of the guide assemblies 1404 of the first stage 1415a. One of the third pins 1530 pivotably couples together the first lever arm 1521 and the attachment arms 1405d of the guide assemblies 1404 of the second stage 1415b. One of the third pins 1530 pivotably couples together the second lever arm 1522 and the attachment arms 1405d of the guide assemblies 1404 of the third stage 1415c. For each of the three wave guide stages 1415a-1415c, the attachment arms 1405d are pivotably coupled to each other.

Movement of the travel block 1512 along at least one of the one or more shafts 1425 pivots the drive arm 1514 to pivot the one or more linkages 1524 and adjust the guide angle μl of the guide assemblies 1404 of the one or more wave guide stages 1415. In one or more embodiments, linear movement of the travel block 1512 in a first direction D1 increases the guide angle μl for the three wave guide stages 1415a-1415c, and linear movement of the travel block 1512 in a second direction D2 decreases the guide angle μl for the guide assemblies 1404 of the three wave guide stages 1415a-1415c.

Figure 17:
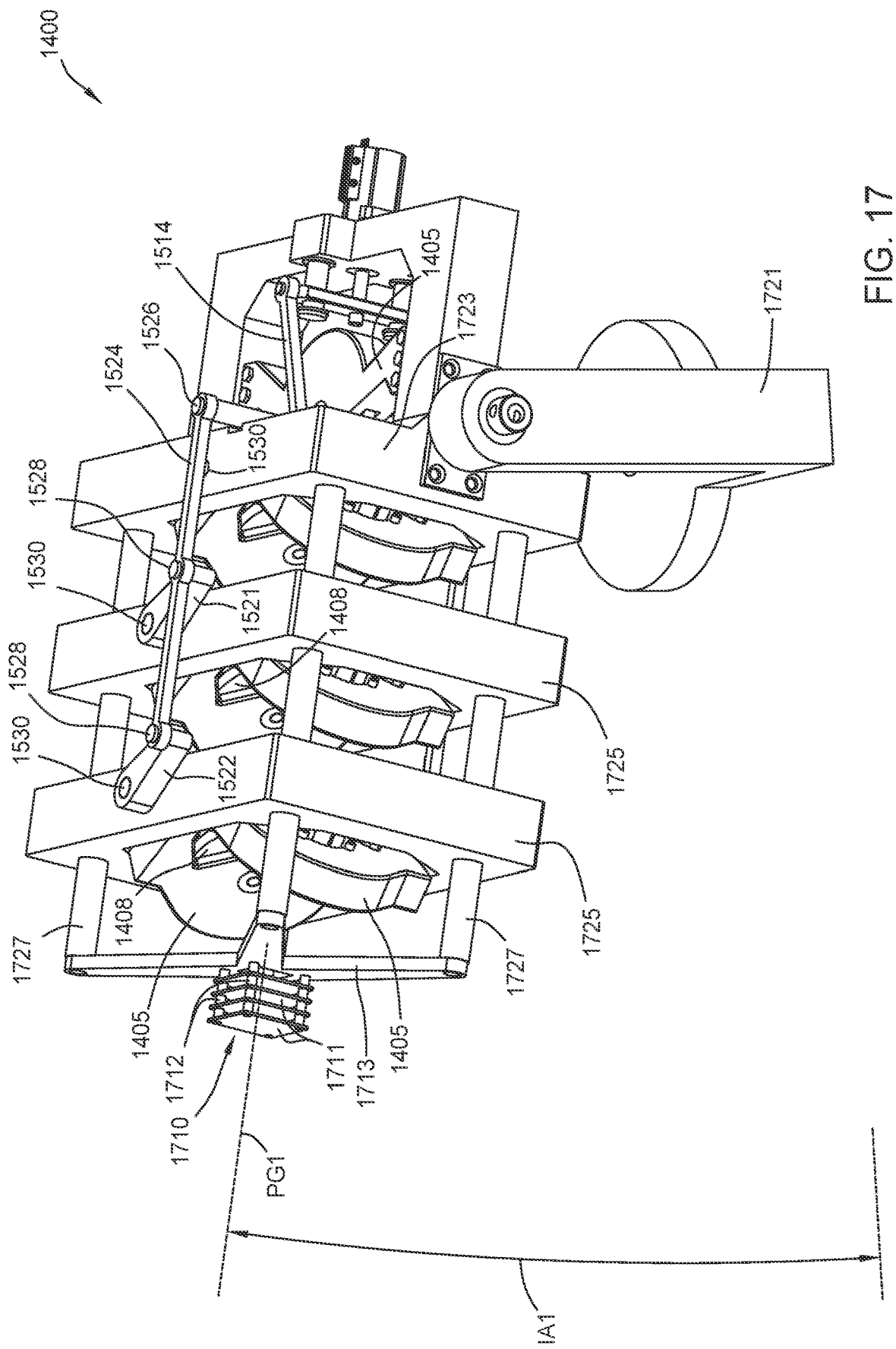
FIG. 17 is a schematic side perspective view of the gravitational wave generator shown in FIGS. 14-16, according to one or more embodiments.

FIG. 17 is a schematic side perspective view of the gravitational wave generator 1400 shown in FIGS. 14-16, according to one or more embodiments.

The gravitational wave generator 1400 includes a feedback detector 1710. The feedback detector 1710 includes a stack of electrically charged plates 1711 positioned along the propagation direction PG1 and on an opposite side of the wave guide stages 1415a-1415c relative to the generator frame 1412.

Each plate 1711 includes an inner surface that is positively charged, and an outer surface 904 that is negatively charged. As generated gravitational wave signals propagate along the propagation direction PG1 and through the plates 1711 an innermost plate 1711 (closest to the wave guide stages 1415a-1415c) is electrically tuned to release one electron when disturbed by a gravitational wave and each subsequent plate 1711 in the stack is tuned to release additional electrons in response to the first electron's release from the inner plate 1711. The result is a cascade of electrons at the outer plate, transforming the gravitational wave signal into an amplified electrical signal for information analysis using one or more electrical circuits for decoding information. The cascade of electrons can be used to measure and monitor the generated gravitation wave signals at the gravitational wave generator 1400. A plurality of detector rods 1712 mount the plates 1711 to a cruciform 1713.

The gravitational wave generator 1400 includes a base frame 1721, and a carriage frame 1723 pivotably coupled to the base frame 1721. In one or more embodiments, the one or more shafts 1425 are mounted to the carriage frame 1723.

The gravitational wave generator 1400 includes one or more spacer frames 1725 spaced from the carriage frame 1723, and a plurality of rods 1727 extending through the one or more spacer frames 1725 and into the carriage frame 1723. The feedback detector 1710 is mounted to the plurality of rods 1727 using the cruciform 1713 coupled to the rods 1727. The carriage frame 1723 is pivotable relative to the base frame 1721 such that pivoting of the carriage frame 1723 relative to the base frame 1721 adjusts an incline angle IA1 of the propagation direction PG1.

The attachment arms 1405d of the guide frames 1405 are disposed within the spacer frames 1725, and the first and second lever arms 1521, 1522 and the one or more linkages 1524 are disposed outside of the spacer frames 1725. The third pins 1530 are disposed respectively through the spacer frames 1725 and the carriage frame 1723.

The present disclosure contemplates that the gravitational wave generator 1400 shown in FIGS. 14-17 can be used as at least part of the transmitter 110 shown in FIG. 1A. For example, the first rotatable mass 1402 can be used as at least part of the one or more rotatable masses 111 and the second rotatable masses 1408 can be used as at least part of the one or more wave guides 112.

Figure 18:
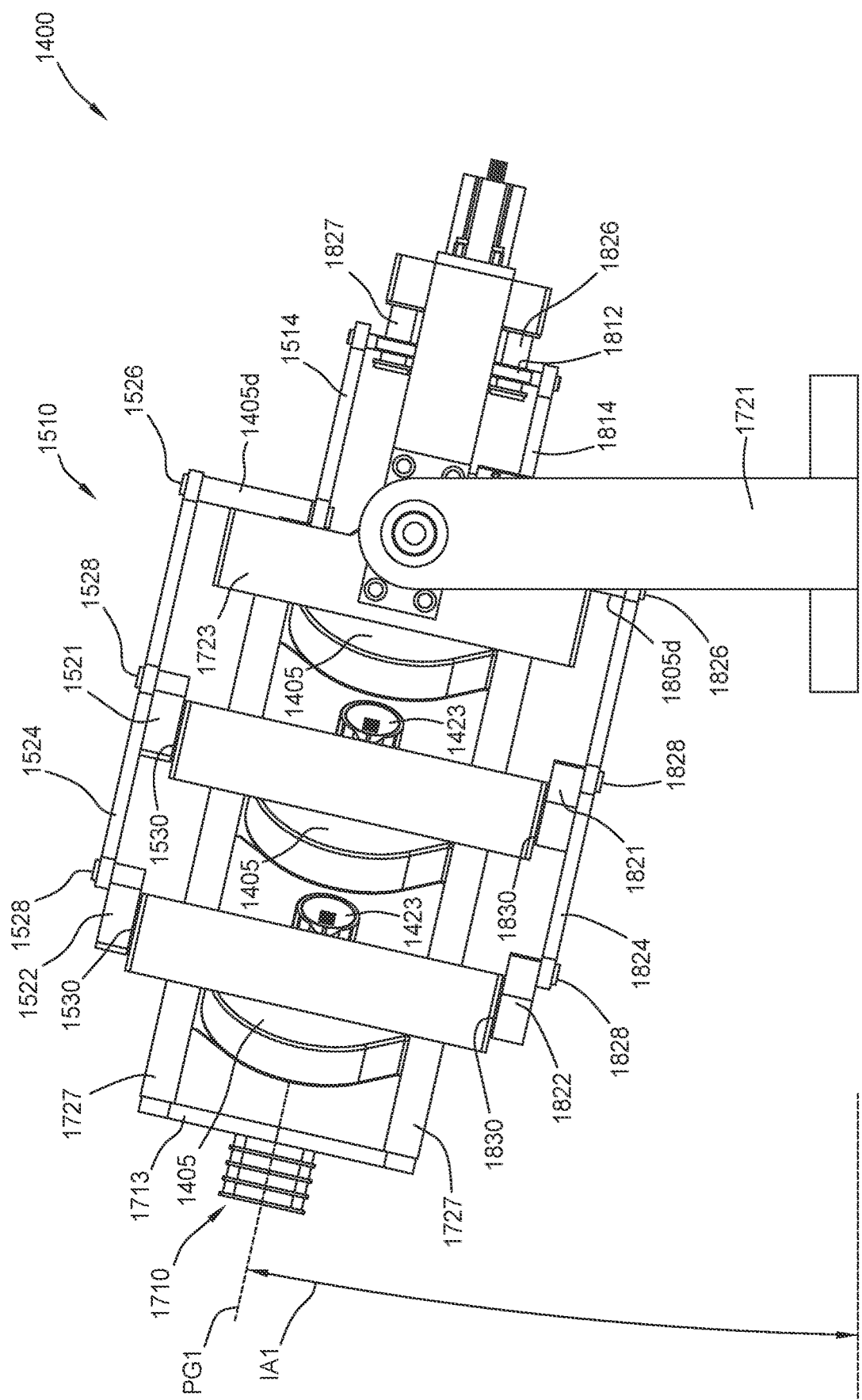
FIG. 18 is a schematic side view of the gravitational wave generator shown in FIGS. 14-17, according to one or more embodiments.

FIG. 18 is a schematic side view of the gravitational wave generator 1400 shown in FIGS. 14-17, according to one or more embodiments.

Figure 19:
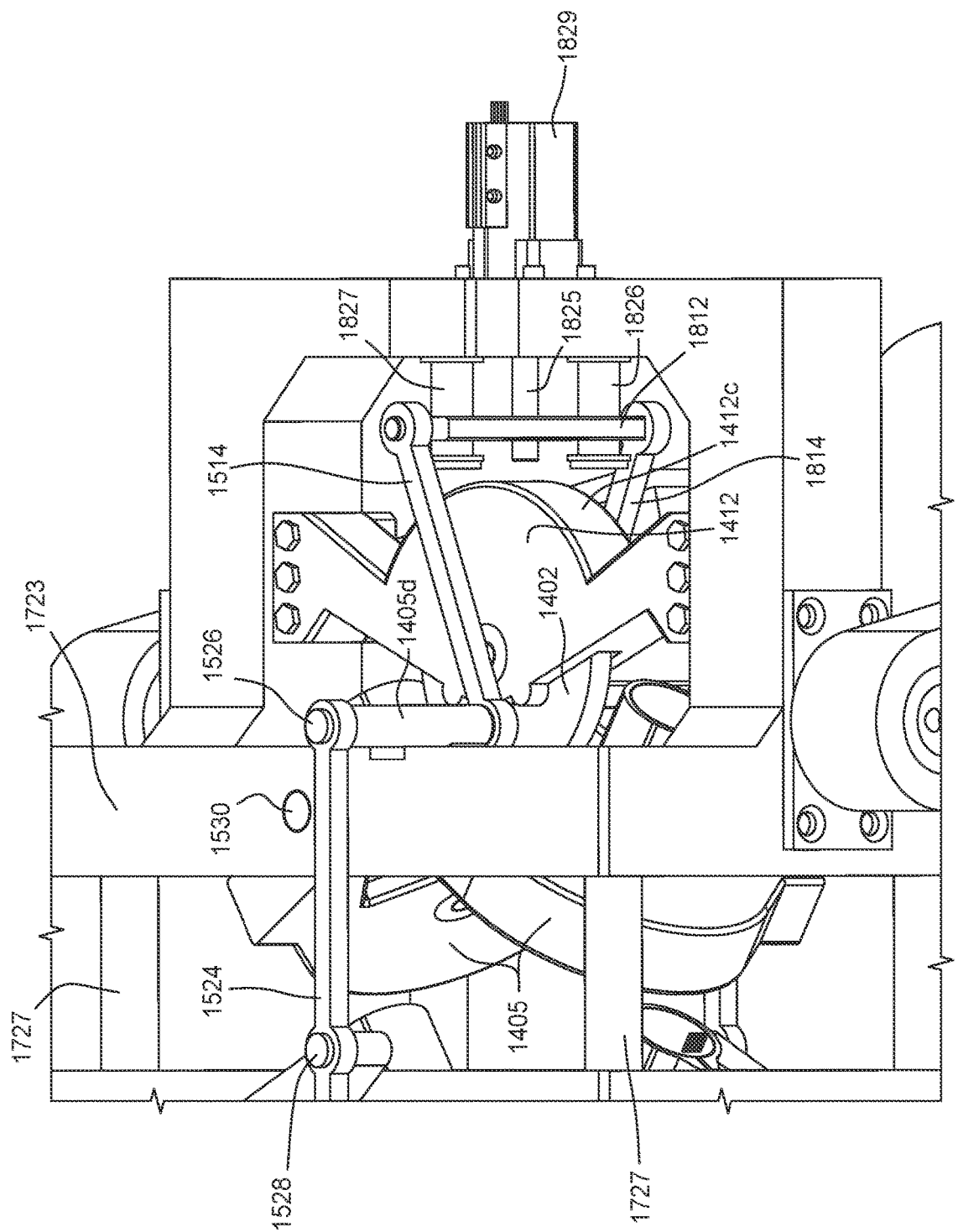
FIG. 19 is a schematic top perspective view of the gravitational wave generator shown in FIG. 18, according to one or more embodiments.

FIG. 19 is a schematic top perspective view of the gravitational wave generator 1400 shown in FIG. 18, according to one or more embodiments. In the implementation shown, the adjustment assembly 1510 includes a travel block 1812 disposed along a drive shaft 1825 and a pair of guide shafts 1826, 1827. The adjustment assembly 1510 includes the drive arm 1514 and a second drive arm 1814 pivotably coupled to the travel block 1812 and pivotably coupled to the guide frame 1405 of one of the guide assemblies 1404.

The second drive arm 1814 is pivotably coupled to a second attachment arm 1805d of one of the two or more guide assemblies 1404 of the first stage 1415a.

The adjustment assembly 1510 includes a third lever arm 1821 pivotably coupled to the two or more guide assemblies 1404 of the second stage 1415b, and a fourth lever arm 1822 pivotably coupled to the two or more guide assemblies 1404 of the third stage 1415c. Adjustment assembly 1510 includes one or more linkages 1824 pivotably coupled to the third lever arm 1821, the fourth lever arm 1822, and the second attachment arm 1805d of the one of the two or more guide assemblies 1404 of the first stage 1415a to which the second drive arm 1814 is pivotably coupled.

A fourth pin 1826 is inserted to pivotably couple together the second drive arm 1814, the second attachment arm 1805*d*, and the one or more second linkages 1824. Fifth pins 1828 are inserted to pivotably couple together the one or more second linkages 1824, the third lever arm 1821, and the fourth lever arm 1822. The gravitational wave generator 1400 includes sixth pins 1830. One of the sixth pins 1830 pivotably couples together the second attachment arms 1805*d* of each of the first stage 1415*a* of guide assemblies 1404. One of the sixth pins 1830 pivotably couples together the third lever arm 1821 and the second attachment arms 1805*d* of the second stage 1415*b* of guide assemblies 1404. One of the sixth pins 1830 pivotably couples together the fourth lever arm 1822 and the second attachment arms 1805*d* of the third stage 1415*c* of guide assemblies 1404. For each of the three wave guide stages 1415*a*-1415*c*, the attachment arms 1805*d* are pivotably coupled to each other.

A drive motor 1829 is configured to drive the drive shaft 1825 to move the travel block 1812 along the guide shafts 1826, 1827. Movement of the travel block 1812 along the drive shaft 1825 pivots the drive arm 1514 and the second drive arm 1814 to pivot the one or more linkages 1524 and the one or more second linkages 1824, and adjust the guide angle μl of the guide assemblies 1404. The drive shaft 1825 is spaced from the rim wall 1412*c* of the guide frame 1412. The guide frame 1412 is coupled to the carriage frame 1723.

FIG. 20 shows an equation 2000 that approximates a gravitational field component ($g_{\mu\nu}$), according to one or more embodiments. As described above, the gravitational field component ($g_{\mu\nu}$) is induced by rotating one or more rotatable masses at a non-uniform angular velocity (e.g., using an angular acceleration and/or an angular deceleration). The gravitational field component ($g_{\mu\nu}$) is a non-linear component that is orthogonal to a field vector component that is present when the one or more rotatable masses are rotationally stationary.

FIG. 21 shows an equation 2100 that approximates a change in wave velocity to an exponent of distance (r) ($dv_\lambda^r$) divided by a change in wavelength (dλ), according to one or more embodiments.

FIG. 22 shows an equation 2200 that approximates an angle of deflection ($d\theta_{deflection}$) of a graviton ray, according to one or more embodiments. The angle of deflection ($d\theta_{deflection}$) is an angle by which a graviton ray (e.g., one or more gravitational wave signals 1407 shown in FIG. 14) deflect under gravitational influence of rotating masses (e.g., rotation of the second rotatable masses 1408 shown in FIG. 14). For example, The angle of deflection ($d\theta_{deflection}$) can deflect the one or more gravitational wave signals 1407 shown in FIG. 14 to guide the one or more gravitational wave signals 1407 along the propagation axis PG1.

In the various equations 2000, 2100, 2200 shown in FIGS. 20-22: angle (θ) is a trajectory angle of a graviton ray (e.g., one or more gravitational wave signals 1407) relative to a principal axis (e.g., the propagation axis PG1 shown in FIG. 14); angle (ϕ)) is a guide angle (e.g., guide angle μl shown in FIG. 14) relative to a principal axis (e.g., the propagation axis PG1); distance (d) is a distance from a generator axis (e.g., the generator axis 1406 shown in FIG. 14) to a wave guide axis (e.g., the guide axis 1411 shown in FIG. 14); distance (r) is a distance from the graviton ray to the wave guide axis (e.g., the guide axis 1411); radius (R) is a wave guide radius (such as the second radius R2 shown in FIG. 14); factor (p) is equal to the radius (R) divided by the distance (r); velocity ($v_t$) is a wave velocity (e.g., of the one or more gravitational wave signals 1407) at a point in time; velocity change ($dv_t$) is a change in the velocity ($v_t$); velocity ($v_\lambda$) is a wave velocity (e.g., of the one or more gravitational wave signals 1407) at a wavelength (λ); and factor (c) is the speed of light in a vacuum.

Benefits of the present disclosure include accurate and effective wireless communication at lower generation powers, including transfer of information; reduced or eliminated transmission interference (such as reduced or eliminated transmission interference from non-gravitational factors) at long transmission distances; detecting and decoding signals at long transmission distances using relatively small detectors; reduced or eliminated effects of barriers (such as the earth, the lithosphere, other planets, and/or structural barriers); reduced or eliminated risk of communication interception; squeezing and stretching of gravitational waves as the waves travel through space; fast transmission (e.g., at the speed of light); focusing (e.g., collimating) gravitational waves in at least a semi-coherent manner, such as a coherent manner; reduced or eliminated effects of line-of-sight issues; communication at longer ranges; and reduced or eliminated effects of environmental factors (such as solar winds, storms, and/or atmospheric ionization); reduced or eliminated infrastructure risks.

As an example, the gravitational waves interact weakly with barriers such that the barriers are nearly transparent to the gravitational waves. As another example, space communication can still occur when a receiver in orbit or on another planet loses proper line of sight with a transmitted on earth without a relay satellite. As another example, wireless communication can occur for subterranean structures that are below rock, concrete, and/or steel. As a further example, communication can still occur when infrastructure risks occur (such as satellite disruption and/or power grid disruption).

As yet another example, gravitational wave signals can be focused (e.g., collimated) to accurately transmit and detect signals at relatively long distances, using detectors with relatively low form factors, and with relatively low input power to generate the signals.

Other applications are contemplated using described subject matter of the present application. As an example, gravitation waves can be used to detect and/or deflect (e.g., away from earth) asteroids. As another example, gravitational waves can be used to detect and/or remove space debris (e.g., orbital debris). As another example, gravitational waves can be used to wirelessly transmit power (e.g., for propulsion), such as to vehicles and/or facilities.

It is contemplated that one or more of the aspects disclosed herein may be combined. Moreover, it is contemplated that one or more of these aspects may include some or all of the aforementioned benefits. As an example, it is contemplated that one or more aspects, features, factors, components, operations, and/or properties of the system 100, the method 200, the CSAC 300, the graph 400, the rotatable mass 500, the microwave cavity detector 600, the toroidal waveguide 700, the fiber optic detector 800, the photoamplifier detector 900, the system 1000, the system 1100, the system 1200, the method 1300, the gravitational wave generator 1400, the equation 2000, the equation 2100, and/or the equation 2200 may be combined.

The present disclosure contemplates that terms such as "couples," "coupling," "couple," and "coupled" may include fusing, welding, interference fitting, and/or fastening such as by using bolts, threaded connections, and/or screws. The present disclosure contemplates that terms such as "couples," "coupling," "couple," and "coupled" may include integrally forming. The present disclosure contemplates that terms such as "couples," "coupling," "couple," and "coupled" may include direct coupling and/or indirect coupling.

The present disclosure contemplates a variety of sizes and/or scalings can be used for the implementations and aspects described herein.

It will be appreciated by those skilled in the art that the preceding implementations are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the implementations described herein may be substituted in for one or more of the other aspects described. The scope of the disclosure is determined by the claims that follow.

We claim:

1. A gravitational wave generator, comprising:
    a generator frame;
    a first rotatable mass mounted to the generator frame, wherein the first rotatable mass is rotatable about a generator axis and rotatable relative to the generator frame to generate one or more gravitational waves; and
    one or more wave guide stages comprising two or more guide assemblies that each comprise:
        a guide frame, and
        a second rotatable mass mounted to the guide frame, wherein the second rotatable mass is rotatable about a guide axis and rotatable relative to the guide frame to at least partially focus the one or more gravitational waves into one or more collimated beams, wherein the guide axis is oriented non-parallel to the generator axis.

2. The gravitational wave generator of claim 1, further comprising:
    a generator motor mounted to the generator frame and coupled to a generator shaft extending through the first rotatable mass.

3. The gravitational wave generator of claim 2, wherein each of the two or more guide assemblies further comprises a guide motor mounted to the guide frame and coupled to a guide shaft extending through the second rotatable mass.

4. The gravitational wave generator of claim 1, wherein the generator frame and the guide frame each comprise:
    a pair of side walls;
    a rim wall extending between the side walls;
    a well opening defined at least partially by the rim wall and the side walls; and
    an attachment arm.

5. The gravitational wave generator of claim 4, wherein: rotation of the first rotatable mass generates the one or more gravitational waves along a propagation direction that is orthogonal to the generator axis and extending through the rim wall of the generator frame.

6. The gravitational wave generator of claim 5, wherein each of the one or more wave guide stages comprises a pair of the guide assemblies arranged on opposite sides of the propagation direction.

7. The gravitational wave generator of claim 6, wherein the one or more wave guide stages comprise at least three wave guide stages arranged in an array along the propagation direction.

8. The gravitational wave generator of claim 5, wherein the second rotatable mass of each of the two or more guide assemblies are oriented at a guide angle relative to the propagation direction, wherein the guide angle is an acute angle.

9. The gravitational wave generator of claim 5, further comprising one or more shafts disposed adjacent to the rim wall of the generator frame, wherein a longitudinal axis of at least one of the one or more shafts is parallel to or coaxial with the propagation direction.

10. The gravitational wave generator of claim 4, wherein each of the first rotatable mass and the second rotatable mass comprises a disc positioned partially in the well opening of the respective generator frame or guide frame.

11. The gravitational wave generator of claim 1, wherein the guide axis is oriented tangentially to the generator axis.

12. The gravitational wave generator of claim 1, wherein the first rotatable mass is spinnable about the generator axis, the generator axis extends through a first center of mass of the first rotatable mass, the second rotatable mass is spinnable about the guide axis, and the guide axis extends through a second center of mass of the second rotatable mass.

13. A gravitational wave generator, comprising:
    a generator frame;
    a first rotatable mass mounted to the generator frame, wherein the first rotatable mass is rotatable about a generator axis;
    one or more wave guide stages comprising two or more guide assemblies that each comprise:
        a guide frame, and
        a second rotatable mass mounted to the guide frame, wherein the second rotatable mass is rotatable about a guide axis, and the guide axis is oriented non-parallel to the generator axis; and
    an adjustment assembly configured to adjust the guide axis of each second rotatable mass of the two or more guide assemblies, the adjustment assembly comprising:
        a drive shaft,
        a travel block disposed along the drive shaft, and
        a drive arm pivotably coupled to the travel block and pivotably coupled to the guide frame.

14. The gravitational wave generator of claim 13, wherein the generator frame and the guide frame each comprise:
    a pair of side walls;
    a rim wall extending between the side walls;
    a well opening defined at least partially by the rim wall and the side walls; and
    an attachment arm.

15. The gravitational wave generator of claim 14, wherein rotation of the first rotatable mass generates one or more gravitational waves along a propagation direction that is orthogonal to the generator axis and extending through the rim wall of the generator frame.

16. The gravitational wave generator of claim 15, wherein the one or more wave guide stages comprise:
    a first wave guide stage including two or more guide assemblies;
    a second wave guide stage including two or more guide assemblies spaced from the first wave guide stage along the propagation direction; and
    a third wave guide stage including two or more guide assemblies spaced from the second wave guide stage along the propagation direction.

17. The gravitational wave generator of claim 16, wherein the drive arm is pivotably coupled to the attachment arm of one of the two or more guide assemblies of the first wave guide stage, and the adjustment assembly further comprises:
- a first lever arm pivotably coupled to the two or more guide assemblies of the second wave guide stage;
- a second lever arm pivotably coupled to the two or more guide assemblies of the third wave guide stage; and
- one or more linkages pivotably coupled to the first lever arm, the second lever arm, and the attachment arm of the one of the two or more guide assemblies of the first wave guide stage.

18. The gravitational wave generator of claim 17, wherein the second rotatable mass of each of the two or more guide assemblies of each of the first, second, and third wave guide stages is oriented at a guide angle relative to the propagation direction, wherein movement of the drive shaft moves the travel block and pivots the drive arm to pivot the one or more linkages and adjust the guide angle.

19. The gravitational wave generator of claim 15, further comprising a feedback detector, wherein the feedback detector comprises a stack of electrically charged plates positioned along the propagation direction and on an opposite side of the one or more wave guide stages relative to the generator frame.

20. The gravitational wave generator of claim 19, further comprising:
- a base frame;
- a carriage frame pivotably coupled to the base frame, wherein the drive shaft is mounted to the carriage frame;
- one or more spacer frames spaced from the carriage frame; and
- a plurality of rods extending through the one or more spacer frames and into the carriage frame, wherein the feedback detector is mounted to the plurality of rods.

21. The gravitational wave generator of claim 20, wherein pivoting of the carriage frame relative to the base frame adjusts an incline angle of the propagation direction.

* * * * *